US007925601B2

(12) United States Patent
Douceur et al.

(10) Patent No.: US 7,925,601 B2
(45) Date of Patent: Apr. 12, 2011

(54) REDUCING BANDWIDTH REQUIREMENTS FOR PEER-TO-PEER GAMING BASED ON ERROR DIFFERENCE BETWEEN ACTUAL GAME OBJECT STATE AND SIMULATED GAME OBJECT STATE BEING BELOW AN ERROR THRESHOLD

(75) Inventors: John R. Douceur, Bellevue, WA (US); Jacob R. Lorch, Bellevue, WA (US); Jeffrey Anson Pang, Pittsburgh, PA (US); Frank Christopher Uyeda, San Diego, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/581,807

(22) Filed: Oct. 19, 2009

(65) Prior Publication Data

US 2010/0035695 A1 Feb. 11, 2010

Related U.S. Application Data

(63) Continuation of application No. 11/559,338, filed on Nov. 13, 2006, now Pat. No. 7,627,632.

(51) Int. Cl.
*G06F 15/18* (2006.01)
*G06F 15/16* (2006.01)
*G06F 17/00* (2006.01)
*G06F 19/00* (2006.01)
*A63F 9/24* (2006.01)
*A63F 13/00* (2006.01)

(52) U.S. Cl. .................. 706/14; 709/205; 463/2; 463/42
(58) Field of Classification Search .................... 706/14; 709/205
See application file for complete search history.

(56) References Cited

U.S. PATENT DOCUMENTS

| 5,056,031 A | 10/1991 | Nakano et al. |
| 5,408,598 A | 4/1995 | Pryor, Jr. |
| 5,652,871 A * | 7/1997 | Steinman et al. ................. 703/6 |

(Continued)

FOREIGN PATENT DOCUMENTS

WO    WO9814886 A1    4/1998

(Continued)

OTHER PUBLICATIONS

Kenny, Alan, Seamus McLoone, Tomas Ward and Declan Delany "Using User Perception to Determine Suitible Error Thresholds for Dead Reckoning in Distributed Interactive Applications" ISSC 2006, Dublin Institute of Technology Jun. 28-30. [ONLINE] Downloaded Dec. 3, 2010. http://ieeexplore.ieee.org/stamp/stamp.jsp?arnumber=04123868.*

(Continued)

*Primary Examiner* — Donald Sparks
*Assistant Examiner* — Ben M Rifkin
(74) *Attorney, Agent, or Firm* — Lee & Hayes, PLLC

(57) ABSTRACT

Techniques enable the reduction of bandwidth requirements for peer-to-peer gaming architectures. In some embodiments, these techniques allow differentiation among players to decide which players should receive continuous updates and which should receive periodic updates. For those gaming systems receiving periodic updates, guided artificial intelligence is employed to simulate activity of a game object based on guidance provided by the periodic updates. Conversely, for those gaming systems receiving continuous updates, the continuous updates may be employed to update the activity of the game object rather than simulating the activity.

6 Claims, 11 Drawing Sheets

U.S. PATENT DOCUMENTS

| | | | |
|---|---|---|---|
| 5,695,400 | A | 12/1997 | Fennell, Jr. et al. |
| 5,755,620 | A | 5/1998 | Yamamoto et al. |
| 5,816,913 | A | 10/1998 | Nakamura |
| 5,899,810 | A | 5/1999 | Smith |
| 6,042,477 | A | 3/2000 | Addink |
| 6,076,114 | A | 6/2000 | Wesley |
| 6,094,677 | A | 7/2000 | Capek et al. |
| 6,126,548 | A * | 10/2000 | Jacobs et al. ............ 463/42 |
| 6,256,047 | B1 | 7/2001 | Isobe et al. |
| 6,415,317 | B1 | 7/2002 | Yelon et al. |
| 6,417,854 | B1 | 7/2002 | Isowaki et al. |
| 6,443,733 | B1 | 9/2002 | Stone |
| 6,708,142 | B1 | 3/2004 | Baillot et al. |
| 6,947,761 | B2 | 9/2005 | Hutcheson et al. |
| 7,004,839 | B2 | 2/2006 | Suzuki et al. |
| 2003/0177187 | A1 | 9/2003 | Levine et al. |
| 2004/0029638 | A1 | 2/2004 | Hytcheson et al. |
| 2004/0075677 | A1 | 4/2004 | Loyall et al. |
| 2004/0121829 | A1 | 6/2004 | Reed |
| 2005/0026692 | A1 | 2/2005 | Dyl |
| 2005/0059491 | A1 | 3/2005 | Oh |
| 2005/0192098 | A1 | 9/2005 | Guo et al. |
| 2006/0135258 | A1 | 6/2006 | Maheshwari et al. |
| 2006/0154713 | A1 | 7/2006 | Sunazuka et al. |
| 2007/0027583 | A1 | 2/2007 | Tamir et al. |
| 2007/0078918 | A1 | 4/2007 | Nagasaka et al. |

FOREIGN PATENT DOCUMENTS

| | | |
|---|---|---|
| WO | WO03053531 A1 | 7/2003 |

OTHER PUBLICATIONS

Madden, Dermot Declan Delaney, Seamus McLoone, Tomas Ward "Visibility Path-finding in relation to Hybrid Strategy Based models in Distributed Interactive Appliactions" Proceedings of the Eighth IEEE International Symposium on Distributed Simulation and Real-Time Applications 2004. [ONLINE] Downloaded Dec 3, 2010. http://ieeexplore.ieee.org/stamp/st.*

Ju, et al., "Mean Value Coordinates for Closed Triangular Meshes", International Conference on Computer Graphics and Interactive Techniques, SIGGRAPH 2005, ACM, 2005, pp. 561-556.

Worsey, et al., "An n-Dimensional Clough-Tocher Interpolant", Constructive Approximation, 1987, pp. 99-110.

Aronson et al., "Latency Hiding for Network Games", <<http://www.gamasutra.com/view/feature/3230/dead_reckoning_latency_hiding_for_.php>>, Sep. 19, 1997.

Baughman, et al., "Cheat-Proof Playout for Centralized and Distributed Online Games", IEEE INFOCOM, 2001, vol. 1, pp. 104-113.

Bernier, "Latency Compensation Methods in Client-Server In-Game Protocol Design and Optimization", Proceedings of the Game Developers Conference, Feb. 2001.

Chang, et al., "Scalable and Efficient Update Dissemination for Distributed Interactive Applications", available at least as early as <<Sep. 21, 2006>>, at <<http://www.cc.gatech.edu/%7Etychang/mis/changt_disseminationFinal.ps>>, pp. 08.

Ercolano, "Rush Render Queue—Job Priorities", retrieved on Jul. 20, 2009 at <<http://seriss.com/rush-current/rush/rush-priority.html>22 , 1995, 2000, pp. 1-5.

Fujimoto, "Parallel and Distributed Simulation", Proceedings of the 31st Conference on Winter Simulation: Simulation—a Bridge to the Future, vol. 1, Dec. 1999.

Griwodz, "State Replication for Multiplayer Games", retrieved at <<http://delivery.acm.org/10.1145/570000/566505/p29-griwodz.pdf? key1=566505&key2=2838388511&coll=GUIDE&dl=GUIDE&CFID=1399240&CFTOKEN=70518556>>, ACM, 2002, pp. 29-35.

Ishibashi, et al., "A Distributed Control Scheme for Causality and Media Synchronization in Networked Multimedia Games", Proceedings Eleventh International Conference on Computer Communications and Networks, IEEE, Oct. 14-16, 2002, pp. 144-149.

Ishibashi, et al., "Media Synchronization and Causality Control for Distributed Multimedia Applications", IEICE Transactions on Communications, Mar. 2001, vol. E84-B, No. 3, pp. 667-677.

Ishikawa, et al., "Performance Evaluation of a Method for Offering Impartiality to Game Members in Heterogeneous Network Environments", Transactions of the Information Processing Society of Japan, Jul. 2001, vol. 42, No. 7, pp. 1819-1827.

Knutsson, et al., "Peer-to-Peer Support for Massively Multiplayer Games", retrieved at <<http://www.cs.ualberta.ca/~anup/Courses/604/Presentation_files/Lihang/P2Pgames_ Infocom04_Upenns.pdf>>, IEEE Infocom 2004, IEEE, 2004, pp. 12.

Lu, et al., "The Design of Synchronization Mechanisms for Peer-to-Peer Massively Multiplayer Games", available at least as early as <<Sep. 21, 2006>>, at<<http://www.cis.upenn.edu/~hhl/Papers/MS-CIS-04-xy.pdf>>, University of Pennsylvania, pp. 1-5.

McCoy, et al., "Dynamic Hybrid Strategy Models for Networked Multiplayer Games ", retrieved at <<http://www.comp.glam.ac.uk/ASMTA2005/Proc/pdf/game-07.pdf>>, Proceedings 19th European Conference on Modelling and Simulation, ECMS, 2005, pp. 06.

Milojicic, et al., "Peer-to-Peer Computing", HP Laboratories, Jul. 3, 3002, Title Page and pp. 1-51.

Roberts et al., "Maximising Concurrency and Scalability in a Consistent, Causal, Distributed Vitrual Reality System, Whilst Minimising the Effect of Network Delays", Proceedings of the 6th Workshop on Enabling Technologies on Infrastructure for Collaborative Enterprises, Jun. 18-20, 1997, pp. 161-166.

Tran, et al., "An Open Middleware for Large-scale Networked Virtual Environments", Proceedings IEEE Virtual Reality, Mar. 24-28, 2002, pp. 22-29.

Wang, et al., "A Synchronization Mechanism in Networked Virtual Environment", Proceedings IEEE Workshop on Knowledge Media Networking, Jul. 10-12, 2002, pp. 23-27.

Zhou et al., "Time-Space Consistency in Large-Scaled Distributed Vitual Environments", ACM Transactions on Modelingn and Computer Simulation, vol. 14, No. 1, Jan. 2004, pp. 31-47.

* cited by examiner

REDUCING BANDWIDTH REQUIREMENTS FOR PEER-TO-PEER GAMING BASED ON ERROR DIFFERENCE BETWEEN ACTUAL GAME OBJECT STATE AND SIMULATED GAME OBJECT STATE BEING BELOW AN ERROR THRESHOLD

RELATED APPLICATION

This application is a Continuation Application of U.S. application Ser. No. 11/559,338 filed on Nov. 13, 2006, now U.S. Pat. No. 7,627,632 and entitled "REDUCING BANDWIDTH REQUIREMENTS FOR PEER-TO-PEER GAMING BASED ON IMPORTANCE OF REMOTE OBJECTS TO A LOCAL PLAYER" to inventors Douceur et al. The entire contents of U.S. Pat. No. 7,627,632 are hereby incorporated herein by reference.

BACKGROUND

Traditionally, gaming systems were standalone machines that accommodated a limited number of players (e.g., 1-4 players). In this traditional setup, the players all play from this same gaming system, which controls all aspects of the game and outputs video signals onto a single display. In a first person shooter (FPS) type game, for instance, the traditional gaming system creates and controls game objects such as a player avatar (i.e., a representation of that player) for each player, with each avatar being located within a same game world.

In these FPS type games, the traditional gaming system often allocates the television display in equal portions, with each player controlling his or her respective portion and viewing the game from his or her corresponding avatar's point of view. For instance, if four players play an FPS type game, the display divides into four equal parts, each depicting the viewpoint of a player's avatar. Because each avatar exists in the same game world, avatars often encounter and interact with one other. Of course, when a first player's avatar encounters a second player's avatar, a replica of that second player's avatar is reproduced on the first player's portion of the display. Meanwhile, if the second player's avatar looks at the first player's avatar, then the second player's portion of the display should correspondingly illustrate a replica of the first player's avatar. To do so, it is important that the gaming system tracks a current location of each avatar and provides that information to the display portions of the other players. Because the traditional single gaming system creates and controls all of the avatars itself, however, tracking the location of each avatar is easily accomplished, as is reproducing a replica on another player's portion of the display.

As opposed to playing in this traditional manner in which players must generally be located within a same physical room, personal computer-based gaming grew in popularity in part due to the ability to play games over a network with many remote players. In fact, such a network-based gaming environment allows players from all over the world to participate in a same game. Borrowing from this environment, gaming systems now also handle network-based gaming. Multiple gaming systems connected together over such a network can be organized into either a "client-server" architecture or a "peer-to-peer architecture". The "client-server" architecture operates in a manner similar to the traditional gaming environment where a single (server) system creates and controls the entire game and all game objects; the server communicates the state of the game to multiple client systems, which allows physically separated players to participate in the game.

By contrast, in a peer-to-peer architecture, the state and execution of the game and its objects are often partitioned across the gaming systems of the participating peers.

To highlight the consequences of the difference between the traditional gaming environment and the peer-to-peer environment, imagine that a first gaming system controlled by a first player is connected to a second gaming system controlled by a second player. In this example, the first gaming system likely creates and controls a game object such as an avatar of the first player. The second gaming system likely does the same for the second player. Accordingly, in an FPS type game, the first gaming system must update the second gaming system with changes in location and other characteristics of the first player's avatar by sending updates over the network. Similarly, the second gaming system must update, again over the network, the first gaming system with actions of the second player's avatar. Updating gaming systems over the network, however, is a much greater challenge as compared to the traditional gaming environment, which only needed to update the objects maintained within a single system. Creating further difficulty, peer-to-peer architectures generally connect many more than two gaming systems at one time, many or all of which may also need updates.

Therefore, it may be difficult for a gaming system in a peer-to-peer architecture to continually send updates to all connected systems, especially if the player controlling the system employs a network connection with limited upload bandwidth. In fact, even players that connect to the architecture via a typical broadband connection may lack the upload capacity necessary to send updates to all interested gaming systems on every execution frame of the game. This may result in the other players viewing stale views of the replica of that player's avatar. Similarly, when the other players actually receive an update, the changes in the replica's location or other characteristics may appear quite "choppy". In many fast-paced games, such as FPS games, such delays and inconsistencies generally reduce the amount of fun experienced by the game players, as the location and other characteristics of the replicas do not appear realistic or smooth.

SUMMARY

This document describes techniques capable of reducing bandwidth requirements for peer-to-peer gaming architectures. In some embodiments, these techniques allow differentiation among players to decide which players should receive continuous updates and which should receive periodic updates. For those gaming systems receiving periodic updates, guided artificial intelligence is employed to simulate activity of a game object based on guidance provided by the periodic updates. Conversely, for those gaming systems receiving continuous updates, the continuous updates may be employed to update the activity of the game object rather than simulating the activity.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, and/or technique(s) as permitted by the context above and throughout the document.

BRIEF DESCRIPTION OF THE DRAWINGS

The detailed description is described with reference to accompanying figures. In the figures, the left-most digit(s) of a reference number identifies the figure in which the reference number first appears. The use of the same reference numbers in different figures indicates similar or identical items.

DETAILED DESCRIPTION

The following discussion is directed to techniques capable of reducing bandwidth requirements for peer-to-peer gaming architectures. The discussion begins with a section entitled "Peer-to-Peer Network Gaming", which describes an exemplary environment in which the claimed techniques may operate. As illustrated, one or more of the network-connected gaming systems may include a guidable artificial intelligence to replicate activity of game objects controlled by other gaming systems. A section entitled "Pairwise Rapid Agreement" follows, which discusses techniques by which important object interactions may be prioritized and executed within the peer-to-peer gaming architecture. The "Focus Set" section follows and explains differentiating among and prioritizing players to determine a type of update each remote player will receive. A sub-section entitled "Estimating Player Importance" discusses specific techniques for achieving this differentiating and prioritizing of the players. A discussion of "Guidable Artificial Intelligence" follows, which describes how a gaming system's artificial intelligence may utilize periodic updates comprising guidance to replicate a game object's activity. This section also includes sub-sections entitled "Game Object Guidance", "Simulating Game Object Activity", and "Convergence", all of which discuss specific details for accomplishing this game object replication with the guidable artificial intelligence. This section is finally followed by a section entitled "Non-instant Hit Weapons", which discusses intricacies associated with applying the claimed techniques to these types of weapons.

This brief introduction, including section titles and corresponding summaries, is provided for the reader's convenience and is not intended to limit the scope of the claims, nor the proceeding sections.

Peer-To-Peer Network Gaming

Figure 1:
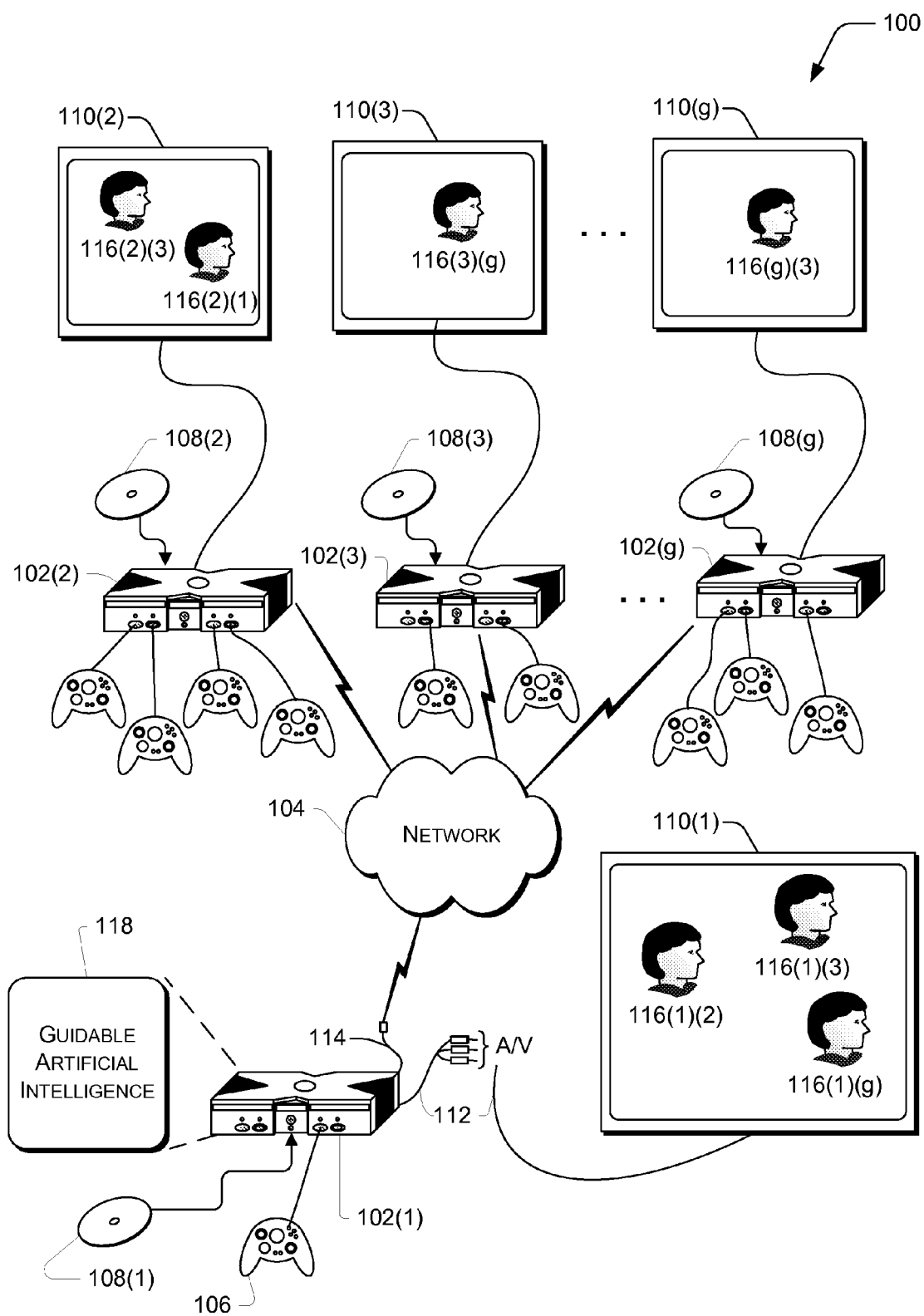
FIG. 1 illustrates a peer-to-peer gaming architecture in which a gaming system with guidable artificial intelligence is connected via a network to other gaming systems that may also include guidable artificial intelligence.

FIG. 1 shows an exemplary gaming environment 100 in which techniques for reducing bandwidth requirements for peer-to-peer gaming architectures may be implemented. The gaming environment 100 includes multiple gaming systems 102(1), 102(2), 102(3), . . . , 102(g), depicted as game consoles, connected over a network 104. While the illustration depicts game consoles, it is specifically noted that any gaming system capable of connecting to a peer-to-peer architecture may be implemented. For instance, one or more gaming systems 102(1)-(g) may include any combination of game consoles, desktop computers, laptop computers, cellular phones, personal digital assistants (PDA's), portable game players, or the like.

As illustrated, the gaming system 102(1) includes up to four controllers, as represented by controller 106, to accommodate up to four players. The gaming system 102(1) is also equipped with an internal hard disk drive and a portable media drive. The portable media drive supports various forms of portable storage media as represented by portable storage disc 108(1). Examples of suitable portable storage media include DVD, CD-ROM, game discs, game cartridges, and so forth. As illustrated, each gaming system 102(1)-(g) may run the same game title as stored on the portable storage discs 108(1)-(g).

The gaming system 102(1) has four slots on its front face to support up to four controllers, although the number and arrangement of slots may be modified. A power button and an eject button are also positioned on the front face of the gaming system 102(1). The power button switches power to the game console and the eject button alternately opens and closes a tray of the portable media drive to allow insertion and extraction of the storage disc 108(1).

The gaming system 102(1) couples to a display 110(1), such as a television or computer monitor, via A/V interfacing cables 112. Each of gaming systems 102(2)-(g) also are shown as coupling to displays 110(2)-(g). A power cable provides power to the gaming system. The gaming system 102(1) may further be equipped with internal or externally added network capabilities, as represented by the cable or modem connector 114 to facilitate access to a network, such as a local area network (LAN) or the Internet.

Each controller (e.g., 106) is coupled to the gaming system 102(1) via a wire or wireless interface. In the illustrated implementation, the controllers are USB (Universal Serial Bus) compatible and are connected to the gaming system via serial cables. The controller 106 may be equipped with any of a wide variety of user interaction mechanisms. As illustrated in FIG. 1, each controller is equipped with two thumbsticks, a D-pad, buttons, and two triggers. These mechanisms are merely representative, and other known gaming mechanisms may be substituted for or added to those shown in FIG. 1.

A memory unit (MU) may be inserted into the controller 106 to provide additional and portable storage. Portable memory units enable users to store game parameters and transport them for play on other consoles. In the described implementation, each controller is configured to accommodate two memory units, although the controller may employ more or less than two units in other implementations.

The gaming system 102(1) is capable of playing, for example, games, music, and videos. With the different storage offerings, titles can be played from the hard disk drive or the portable medium in the portable medium drive, from an online source, or from a memory unit. As discussed above, each gaming system 102(1)-(g) may concurrently run a same game title stored on portable storage discs 108(1)-(g). The described embodiments that follow will assume that this game title is a first person shooter (FPS) game type, although the discussion is compatible with other game types. Furthermore, it is specifically noted that when this document describes actions of a "gaming system", either the system itself, the game running on the system, or the combination of the two may initiate and/or execute the action.

Also as discussed above, the gaming environment 100 illustrates multiple gaming systems 102(1)-(g) inter-coupled via the network 104. The network 104 may consist of a local area network, the Internet, or the like, and may be implemented using any one or more of a wide variety of conventional communications media including both wired and wireless media. As one example, the network 104 represents an Ethernet cross-over cable or an Ethernet hub. Other possible implementations include FireWire (specifically, IEEE 1394) and universal serial bus (USB).

Many game titles are scalable to support multiple players on different gaming systems. Interconnecting multiple gaming systems via the network 104 enables multiple players to compete in the same game. The multiple players can be composed of any combination of players and gaming systems (e.g., one player on gaming system 102(1), three players on gaming system 102(2), and so on). For simplicity in explanation, the following discussion assumes that a single player plays via each gaming system 102(1)-(g). Furthermore, in the illustrated embodiment, each gaming system 102(1)-(g) has its own copy of the game stored either on a hard disk drive (e.g., an authentic game title purchased and downloaded from a vendor's website) or on the portable storage discs 108(1)-(g).

In such a peer-to-peer architecture, the state and execution of the game and game objects are partitioned across the participating peers. That is, game objects in the game world are allocated amongst each gaming system 102(1)-(g). For instance, in an FPS game, a peer may host an avatar (i.e., a representation of that player), projectiles that the avatar discharges, and possibly other items not controlled by the avatar (e.g., health packs and weapons). The execution of these objects by each player's corresponding gaming system results in reads and writes to a distributed object store.

This distributed object store enables peers playing in the gaming environment 100 to create and view replicas of the objects, such as avatars, controlled by other peers. For instance, the gaming environment 100 depicts that Player One (i.e., the peer playing the game via gaming system 102(1)) views replicas 116(1)(2), 116(1)(3), and 116(1)(g) on the display 110(1) These replicas correspond to game objects controlled by remote Players Two, Three and g, respectively. In other words, the local gaming system 102(1) creates replicas of game objects that are controlled by remote players, and the replicas are viewable on the display 110(1). Of course, not only do the remote players control these game objects, but so too do their corresponding gaming systems.

For nomenclature purposes, replica 116(1)(3) corresponds to the replica created by the gaming system 102(1) and representing a game object controlled by Player Three. Likewise, gaming system 102(1) also creates replicas 116(1)(2) and 116(1)(g), which are intended to replicate game objects controlled by Remote Players Two and g, respectively.

In the illustrated example, these game objects correspond to avatars of each of the players playing the game via gaming systems 102(2), 102(3), and 102(g). In the context of an FPS game, gaming systems may create a replica of a remote avatar in response to the remote avatar's encounters with a local avatar. For instance, gaming system 102(1) may create and view avatar replicas of all three remote players in response to Player One's avatar currently encountering all three remote players in the game. Similarly, Player Two's avatar currently views replicas of the avatars of Players One and Three. Hence, as illustrated, the gaming system 102(2) creates and the display 110(2) exhibits replicas 116(2)(1) and 116(2)(3). In the illustrated example, avatars of Player Three and Player g currently only view each other in the game, and hence their respective gaming systems and displays only create and present replicas of one another.

A gaming system is thus responsible for sending out information relating to game objects it controls. For instance, the gaming system 102(1) is responsible for sending information concerning the location of Player One's avatar to other gaming systems. Gaming systems 102(2)-(g) accordingly receive this information and replicate the activity of Player One's avatar. Generally, if a player utilizing one of gaming systems 102(2)-(g) may soon interact in the near future with this avatar, then the corresponding gaming system creates a viewable replica.

In a gaming environment with unlimited bandwidth, each gaming system would send a continuous stream of updates to every other gaming system. Thus, each gaming system would be comprehensively informed of every game object in the game, and the corresponding locations and other characteristics of each replica would be accurate. As discussed above, however, peers are often limited in the amount of updates they can send, as well as the rate at which they can send them. This may even be true for a peer that utilizes broadband connectivity. For instance, this connection may have an upload rate capability of 128 kilobits per second (Kbps). In some FPS games, object updates average approximately 100 bytes and occur every 50 milliseconds (ms). Even ignoring overhead associated with other control messages, at this size and rate a peer may only support eight remote peers replicating its objects.

In many games that utilize a peer-to-peer architecture, many more than nine players are expected to participate. Meanwhile, merely decreasing update rate by itself has been shown to be objectionable to players, especially in fast-paced games such as FPS games.

The illustrated gaming environment 100, however, may mitigate the problems associated with these low-bandwidth connections through multiple update classes and guidable artificial intelligence. As illustrated, each gaming system 102 includes a guidable artificial intelligence (AI), as represented by guidable AI 118. Guidable AI 118 may exist as a part of hardware, software, or firmware of gaming system 102(1), or it may exist as part of the game located on portable storage disc 108(1). Furthermore, the guidable AI 118 may exist on or in a combination of the gaming system 102(1) and the portable storage disc 108(1).

In peer-to-peer architectures utilizing multiple update classes (e.g., continuous and periodic update classes), the guidable AI 118 uses received guidance to simulate activity of game objects. This guidable AI therefore reduces bandwidth requirements, as the gaming system 102(1) no longer requires the constant updating of game objects in order to create a realistic replica that smoothly moves about on a player's display 110(1). Furthermore, gaming systems running a game may send these different classes of updates depending on each remote player's importance. This is discussed in detail in the "Focus Set" and "Guidable Artificial Intelligence" sections below.

In addition to the updates sent via the multiple update classes, some messages sent within the gaming environment 100 may be of such importance that they deserve prioritization above all other updates. Specifically, interactions that modify the state of an object, such as one avatar shooting and damaging another avatar for instance, may be important enough to warrant the prioritization of the interaction's execution. One manner for prioritizing such interactions between the gaming systems of the gaming environment 100 is via pairwise rapid agreement.

Pairwise Rapid Agreement

This section briefly precedes the discussion of Guidable Artificial Intelligence and update classes and addresses object interactions that fundamentally affect the fairness of the gaming experience, as briefly touched on above. In games such as FPS games, certain elemental interactions directly affect what each player views as the fairness of the game. These game object interactions should be relatively timely and realistic so each player believes that the game acts fairly. For instance, when one player's avatar shoots and hits another player's avatar, the attacker should see the hit and the target should observe some damage. Because the players expect to view such interactions nearly immediately, even small time delays can trouble the players. In fact, only milliseconds generally elapse between the firing of a weapon, a hit, and the taking on of damage. Furthermore, in peer-to-peer architectures, timing delays could be exposed via out-of-band channels, such as chat.

Pairwise Rapid Agreement (PRA) therefore prioritizes and rapidly relays object interactions which are basic to the fairness of the gaming experience. In some instances, a PRA message is similar to one of the messages in a remote procedure call (RPC) between gaming systems.

Figure 2:
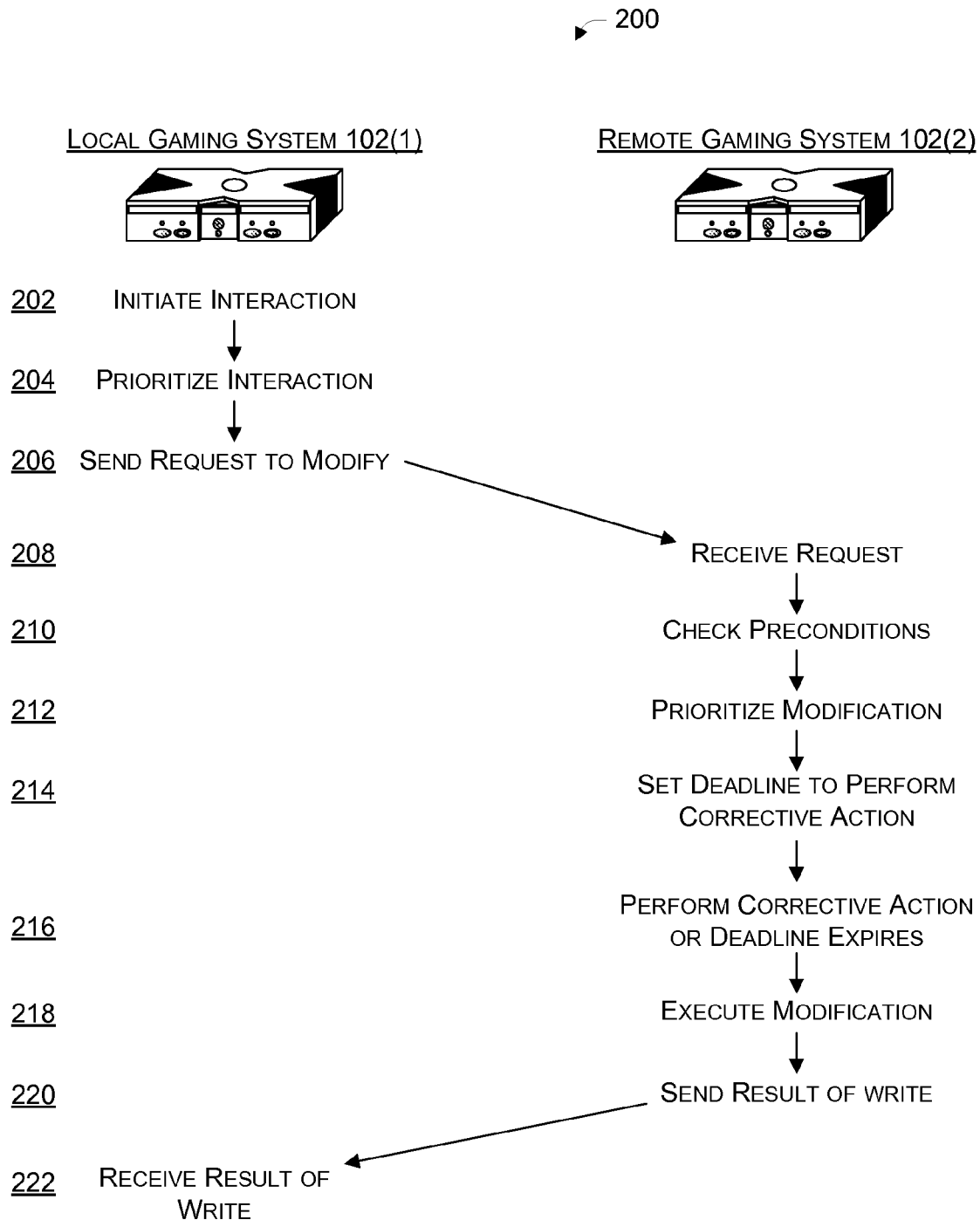
FIG. 2 illustrates an exemplary process for conducting pairwise rapid agreement for an important interaction between a local gaming system and a remote gaming system.

FIG. 2 portrays a process 200 for performing one embodiment of a PRA for an interaction between objects controlled by gaming systems 102(1) and 102(2). Operations listed beneath a certain gaming system either occur at that system or represent actions by objects controlled by that system. At operation 202, a game object controlled by system 102(1) initiates an interaction with a game object controlled by system 102(2). A modification of a game object's state by the execution of some action of another game object defines such an "interaction". A basic example is an avatar controlled by a player of gaming system 102(1) shooting at and hitting an avatar controlled by a player of gaming system 102(2). In some games, such an action decrements the health field of the second player (sometimes to zero), thus modifying the object's state.

A "shooter-decides" paradigm generally holds for instant-hit weapons. That is, when a shooter wielding an instant-hit weapon (e.g., a pistol or rifle) pulls a trigger on a controller such as the controller 106, that shooter's system nearly instantaneously determines whether or not a target is hit. If the shooter's system decides that the target is hit, then that system initiates the object interaction. For non-instant hit weapons (e.g., a missile launcher), the "shootee-decides" paradigm may be utilized, as discussed in a self-entitled section below.

In any event, because interactions occur at human timescales, they generally occur less frequently than object updates (e.g., notifying other players of changes in an object such as an avatar's position). Usually, interactions occur on the order of seconds, as opposed to the milliseconds of updates. Additionally, interactions affect objects of only two players—the initiating player and the player controlling the modified object. Therefore, gaming systems may prioritize PRA messages, possibly over all other updates. Operation 204, for instance, represents the gaming system 102(1) prioritizing the object interaction of operation 202.

At operation 206, the gaming system 102(1) sends a request to modify a state of an object controlled by the gaming system 102(2) and its corresponding player. Operation 208 represents the gaming system 102(2) receiving the request. At operation 210, the gaming system 102(2) checks if one or more preconditions for the interaction exist. If so, such preconditions must be satisfied to enable a successful interaction. For instance, if one avatar shoots another, then one precondition may be that the targeted avatar is still alive. In this example, the gaming system 102(2) will check that its avatar is still alive and, if so, will proceed with process 200. If, however, the targeted avatar has already been killed, but gaming system 102(1) was not aware of this because gaming system 102(1) had been receiving periodic updates from gaming system 102(2), then the precondition is not satisfied, so the state of the object is not updated.

Another precondition example involves an object interaction consisting of one player picking up an object comprising a very important game item, such as a flag in a "capture the flag" game. Here, a precondition may be that the item has not already been picked up. If the item has indeed already been picked up, then the interaction will generally fail. For items that are readily duplicated, however, the game may choose to exclude such a precondition. Such examples may include health packets or weapons. While this may allow multiple players to pick up a single item, such a result may be preferable to a player failing to acquire an item that the player believes the player should have acquired. Also, because many of these items often quickly respawn in many games, such a solution does not substantially affect fairness.

In any event, the gaming system 102(2) checks preconditions and ensures that any such preconditions hold in its local view. At operation 212, the gaming system 102(2) prioritizes the modification. As discussed above, the system will generally prioritize the interaction over other object updates. In some but not all instances, the gaming system 102(2) will set a deadline to perform corrective action at operation 214. Such a deadline allows only a certain amount of time to perform such corrective action, after which point the interaction will execute.

For instance, the gaming system 102(2) may wish that the attacking avatar turn and face the targeted avatar before the latter avatar is shot and takes damage. As discussed below under "Guidable Artificial Intelligence", the gaming system's 102(2) replica of the attacking avatar may slightly differ from the actual state of the avatar. Therefore, the replica of the attacking avatar of gaming system 102(2) may not currently face the targeted avatar, while in reality the attacking avatar directly faces the targeted avatar. Performance of such corrective action will thus allow the attacking avatar to face the targeted avatar, which assists in the interaction's realistic portrayal. When a player is shot, some embodiments may employ a deadline of 200 milliseconds to perform such corrective action. For other types of interactions, such as an item pickup interaction, meanwhile, some embodiments may choose not to employ any deadline, meaning the interaction may occur nearly immediately. Stated otherwise, this is equivalent to using a deadline of 0 seconds.

Operation 216 represents either the performance of corrective action or the expiration of the deadline. Of course, in an interaction without a deadline, the process skips this operation. At any rate, at operation 218, the gaming system 102(2) executes the modification. In the attacking example, the gaming system will cause the targeted avatar to take on and display some damage, or possibly even die. Note that in some instances, the execution of the PRA on the gaming system 102(2) itself results in an interaction from the newly-modified game object to the previous initiating game object. For instance, if the targeted avatar dies in response to the attack, the gaming system 102(2) of the targeted avatar may, in response, send a message to gaming system 102(1) to increment the score of the attacking avatar. This new interaction is generally treated as a separate PRA which may be similarly prioritized over other object updates.

Next, operation 220 represents the remote gaming system 102(2) informing the local gaming system 102(1) of the result of any write performed, such as the execution of the modification. In many instances, the write operation is predictable, which renders operation 220 unnecessary. In other instances, however, the write operation may not be predictable, and operation 220 may therefore be used to appropriately inform the gaming system 102(1). In instances where the gaming system 102(2) performs operation 220, operation 222 follows and represents the gaming system 102(1) receiving the result of the write.

PRA messages may be employed for multiple objection interactions. Such interactions may include player damage, player death, item pickup, and the modification of environmental obstacles, most of which were discussed above. Modification of an environmental obstacle includes, for instance, the opening of a door that another player's gaming system controls. Here, when an initiating object causes a door to change states (e.g., from closed to open), the gaming system controlling the door will check the precondition that the door is actually in the opposite state (e.g., that the door is closed if the initiating object requests it be open). Generally, no deadlines are used for such PRA messages.

Focus Set

Rather than sending continuous object updates to all remote peers, bandwidth requirements in a peer-to-peer gaming architecture may be reduced by tailoring the timing and content of object updates. For instance, updates may be sent more frequently to very important players and less frequently to less important players. Furthermore, content sent amongst these groups may also vary. State information may accompany object updates sent to the former group, while guidance or predictive information may accompany object updates sent to the latter group. In some instances, remote players may be differentiated, prioritized, and grouped; the most important set of peers being labeled a "focus set".

Figure 3:
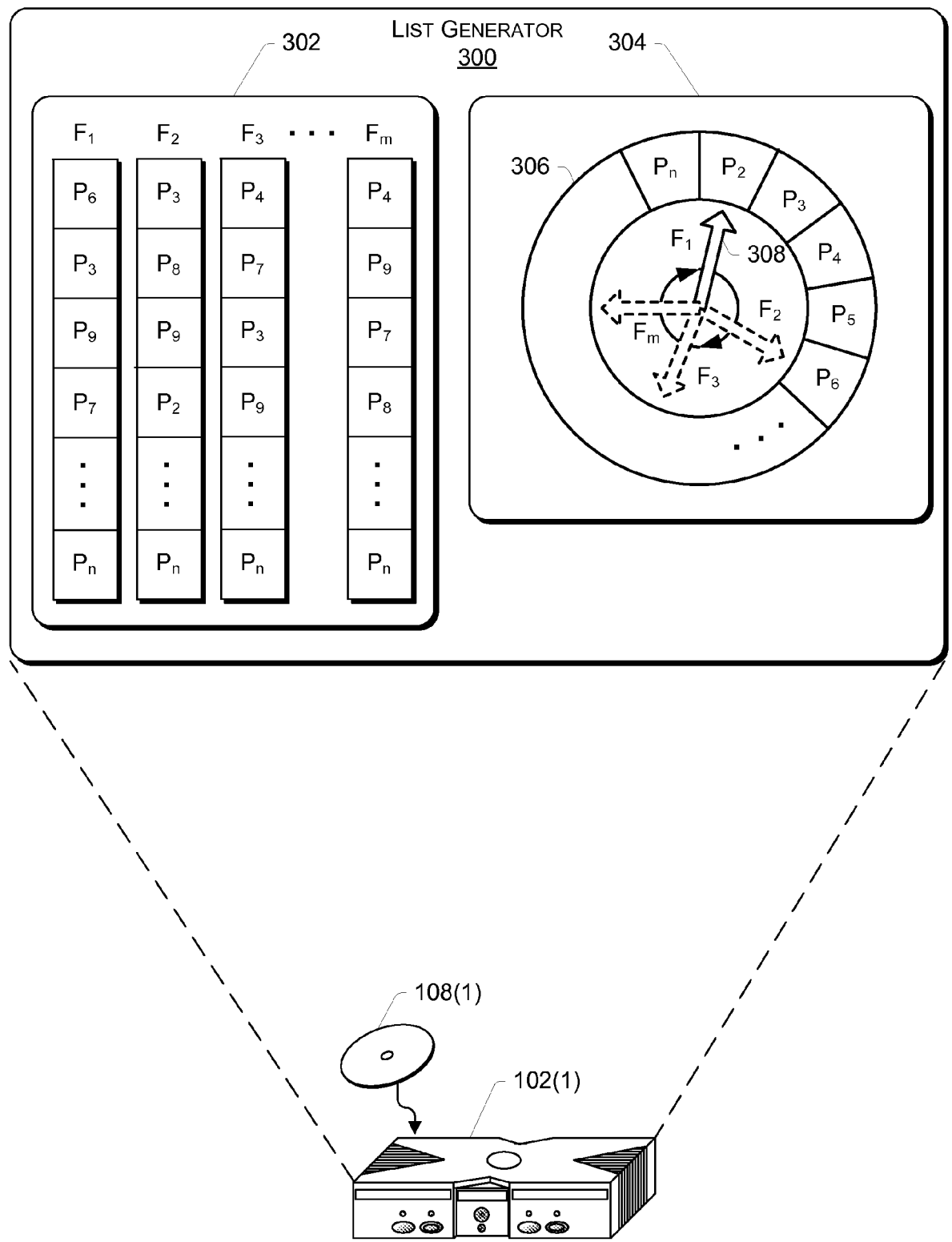
FIG. 3 illustrates an exemplary gaming system with a list generator to differentiate among and prioritize remote peer gaming systems.

With reference to FIG. 3, the gaming system 102(1) running a game on portable storage disc 108(1) may include a list generator 300. Similar to the discussion of the guidable AI 118, the gaming system, the portable storage disc, or a combination of the two may form the list generator 300. For instance, the list generator 300 may consist of hardware, firmware, or software, either present as part of the gaming system or as computer-readable and executable instructions stored on the portable storage disc 108(1). Furthermore, portions of the list generator 300 may also reside on the gaming system 102(1), while other portions may reside on the portable storage disc 108(1).

In any instance, the list generator 300 includes a priority list generator 302 and a round robin list generator 304. The priority list generator 302 differentiates among and prioritizes the remote players in the game from the perspective of the local player operating the gaming system 102(1). In the illustrated example, the player controlling the local system is deemed to be Player One and the number "n" represents the total number of players (note that there may be n players playing on g different gaming systems, and that n and g are presumed equal for the current examples). Assuming the local player is Player One, the resulting priority list identifies Player Two through Player n, with the most important player listed at the top and the least important at the bottom. The techniques used by the priority list generator 302 to make these importance-determinations regarding which players are more important than others are discussed in detail below. The gaming system 102(1) of the local player then uses this list to determine the content and timing of the updates for each remote player. Furthermore, the priority list generator 302 may create new priority lists as the game progresses, possibly at a continuous rate such as once per frame.

Having created a priority list, some implementations separate the remote players into one or more groups. While embodiments employing two groups will be discussed, any number of groups may be utilized. A group containing the most important players, as determined by the priority list generator 302, is generally labeled as the local player's "focus set". The separating or grouping of remote players may occur in a variety of ways. First, groups may consist of a certain threshold number of players. For instance, a focus set may by definition consist of five remote players. Here, the priority list generator 302 will capture the five most important remote players and deem such a collection the local player's focus set. Similarly, other groups of decreasing importance may be grouped in such a way (e.g., a second group may consist of the next five players listed).

In other embodiments, a group is defined when another threshold indicator is reached. For example, one of many envisioned thresholds is an apportioned amount of a local player's bandwidth. Here, bandwidth may be apportioned between a first group including the most important players and one or more other groups including less important players. Envision that of a local player's total available bandwidth, a fraction $\alpha$ is apportioned to send updates to a group including the most important players. In this scenario, the gaming system 102(1) starts from the top of the priority list, sending updates to the remote players in the listed order. However, when the gaming system exhausts the fraction a of the total bandwidth, the local player's "focus set" has been defined and the group is closed. Service of the second group then begins (assuming $\alpha$ is less than 1). Of course, the local player now has a fraction equal to $1-\alpha$ of the total bandwidth available to service the rest of the remote players who did not fall into the local player's focus set. One particular implementation utilizes an $\alpha$ value of approximately 0.77, which may define a focus set size of four players for an amount of total bandwidth equal to 108 Kbps.

In the example illustrated in FIG. 3, the priority list generator 302 creates a priority list for each frame (depicted as $F_1$, $F_2$, $F_3$, . . . , $F_m$). Of course, the priority list generator 302 may be enabled to create new lists at any other rate, or even selectively or randomly. In some instances, the remote players in a local player's focus set will receive continuous updates concerning game objects controlled by the local player, such as the local player's avatar. For example, FIG. 3 shows that in frame one ($F_1$) Remote Players Six ($P_6$), Three ($P_3$), Nine ($P_9$), and Seven ($P_7$) are the four most important players to the local player. Let us assume that the apportioned bandwidth $\alpha$ allows for object updates to be sent in that order to these four players but no more. These four players would then be deemed the local player's focus set for frame one. As long as each one of the players remains in that focus set, that player will receive continuous updates from the local player.

These continuous updates may include exact positional updates of the local player's avatar, as well as other characteristics such as the avatar's aiming angle, the weapon the avatar is currently wielding, and the like.

In subsequent frames, not only will the composition of the focus set likely change, but so may the size of the focus set. This will likely occur in embodiments utilizing an apportioned bandwidth to define the focus set. Addressing these in order, reference is first made to FIG. 3, which shows that at frame two ($F_2$), Remote Players Three ($P_3$), Eight ($P_8$), Nine ($P_9$), and Two ($P_2$) are the four most important players, in that order. Therefore, if the size of the focus set remains four, then these four players will now first receive updates as opposed to the previous group of four. Of course, in an FPS game, respective avatars will often battle one another, and will thus remain in a local player's focus set for multi-frame periods.

However, now assume that the local player's update size has grown, possibly due to increased activity of the local player's avatar. In this scenario, object updates sent to fewer players may consume the apportioned bandwidth $\alpha$. In frame two ($F_2$), therefore, only three players ($P_3$, $P_8$, and $P_9$) may define the focus set and hence receive continuous updates. This leaves Player Two—who would have been in the frame two ($F_2$) focus set if the set's size had remained at four players—to receive updates in the same manner as all other non-focus set remote players.

In some embodiments, after apportioning an amount of bandwidth $\alpha$ to define and service a focus set, the gaming system 102(1) will then employ the round robin list generator 304 to service the remaining remote players. Here, the gaming system provides a "best-effort" class of service to the remaining remote players. For instance, round robin list generator 304 generally includes a round robin list 306 consisting of all the Remote Players $P_2$-$P_n$ currently playing in the peer-to-peer gaming architecture. Generally, the order of this list remains the same throughout the game. While the illustrated list in FIG. 3 is shown to be ordered sequentially, such ordering is entirely arbitrary as long as it remains consistent.

As touched on above, once the focus set has been serviced—and once any other higher priority control messages such as PRA messages have been sent—updates sent via the round robin list 306 may consume the remaining bandwidth. For instance, the list may begin with Player Two at frame 1 ($F_1$) as illustrated in FIG. 3 (again assuming that the local peer controls Player one). A pointer 308 is employed to track the current location on the round robin list 306. After the one or more groups such as the focus set have been serviced, another group may be serviced beginning with the player referenced by the pointer 308, which at frame 1 is Player two. The system will only provide an update to Player Two if the local player's focus set for frame one did not include Player two, and if adequate bandwidth exists. Here, the frame one focus set did not so include this player, so an update is sent to Player Two (assuming available bandwidth). The round robin pointer 308 is then updated to the next player (i.e., Player Three ($P_3$)) in the round robin list 306. The local peer may then service Player Three and so on until these updates have consumed the available bandwidth. Of course, in the current example, the local peer's focus set included Player Three in frame one. As such, the local peer has already provided Player Three with an update and Player Three is therefore skipped.

Remember that in the illustrated embodiment the local peer has apportioned an amount $\alpha$ of the total bandwidth for continuous updates sent to the local peer's focus set. Therefore, an amount of bandwidth equal to $1-\alpha$ of the total bandwidth remains for the non-focus set remote peers. The local peer may thus provide updates to as many of these peers as this amount of bandwidth allows, if any. Of course, the local player may exhaust this amount of bandwidth equal to $1-\alpha$ before providing all players with updates, which is likely with games including many players.

Because these round robin list updates will likely not be sent to every non-focus set player each frame, these updates are termed periodic. In other words, because a remote player might not receive an update every frame, these updates are deemed periodic rather than continuous, as provided to focus set members. As discussed in detail below with reference to guidable AIs, these updates may therefore comprise guidance rather than exact state information.

FIG. 3 highlights this continuous/periodic dichotomy. Once again, recall that the round robin list arbitrarily begins at Player Two in the first frame (again, the round robin list could order the players in any manner). The local player, however, only has enough remaining available bandwidth to provide updates to three additional players. In this example, Players Two, Four, and Five are sent updates as referenced sequentially by pointer 308 (again, the local player's frame one focus set included Player Three, so Player Three is skipped on the round robin list 306). At the end of frame one, therefore, the pointer 308 will be at Player Six on the round robin list 306 for the next update. Accordingly, after the local player provides updates to the player's focus set for frame two, Player Six will be the first non-focus set remote player to receive a periodic update. This of course assumes both that the local peer's focus set excludes Player Six and that adequate bandwidth exists. This process repeats for frames three ($F_3$) through m ($F_m$). Once the local player provides Player n ($P_n$) with an update via the round robin list 306, the pointer 308 cycles back to Player Two (or whichever player the round robin list generator 304 arbitrarily placed first on the list).

Figure 4:
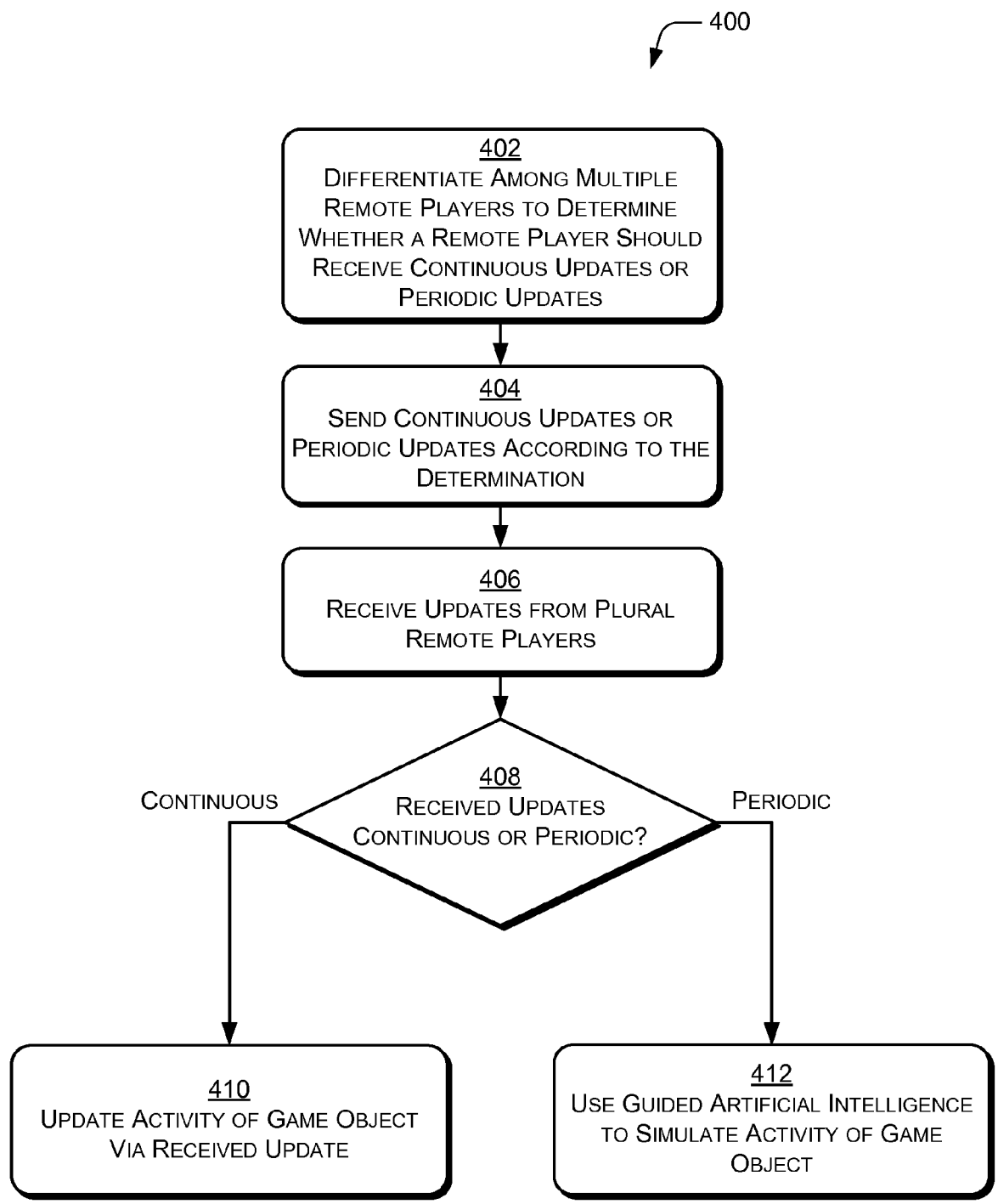
FIG. 4 is a flow diagram that illustrates differentiating among players, sending continuous or periodic updates based on the differentiation, and receiving either continuous or periodic updates.
Figure 5:
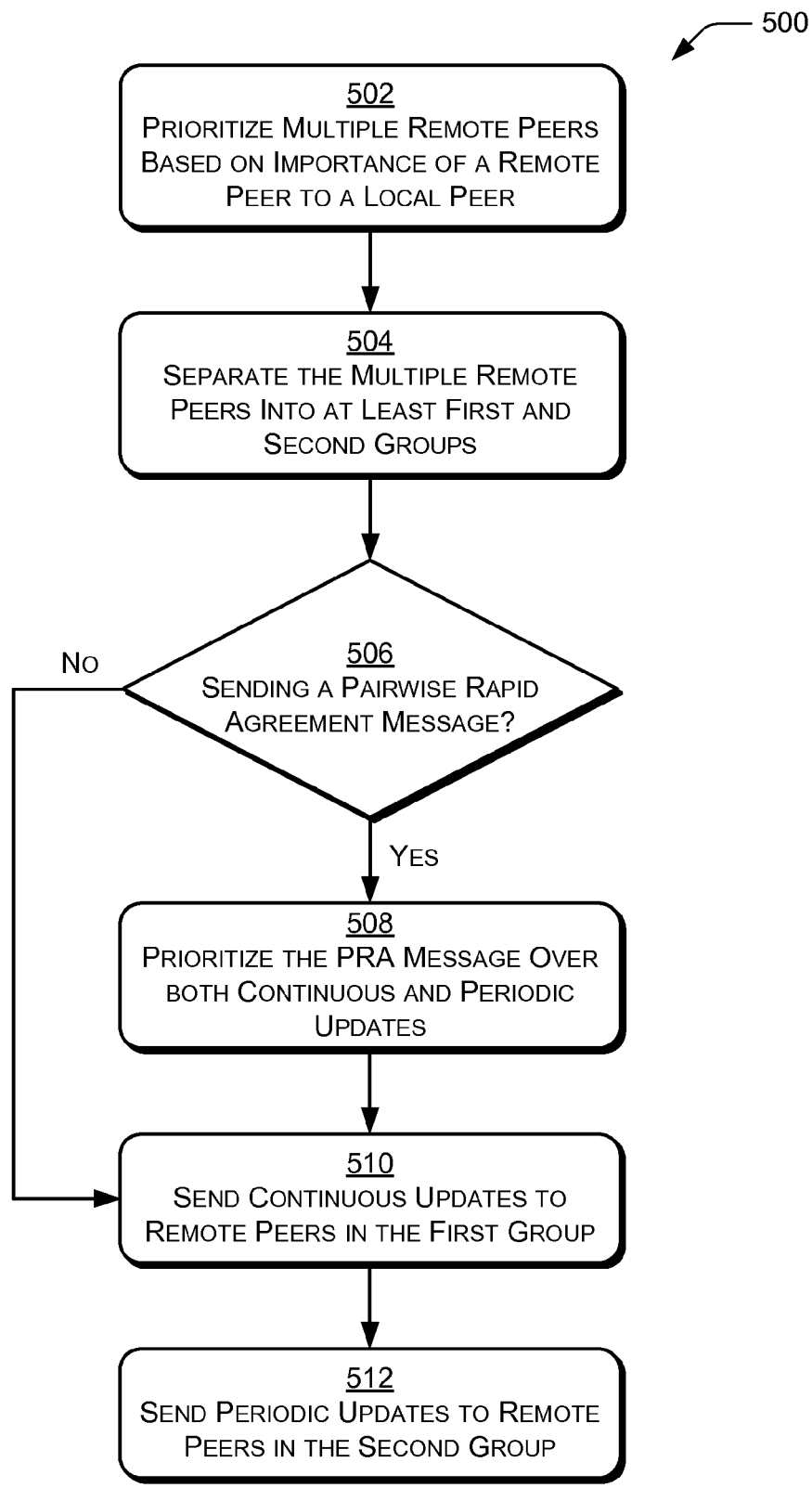
FIG. 5 is another flow diagram that illustrates prioritizing multiple peers to separate the peers into first and second groups, sending continuous updates to peers in the first group, sending periodic updates to peers in the second group, and prioritizing pairwise rapid agreement messages over both the continuous and periodic updates.
Figure 6:
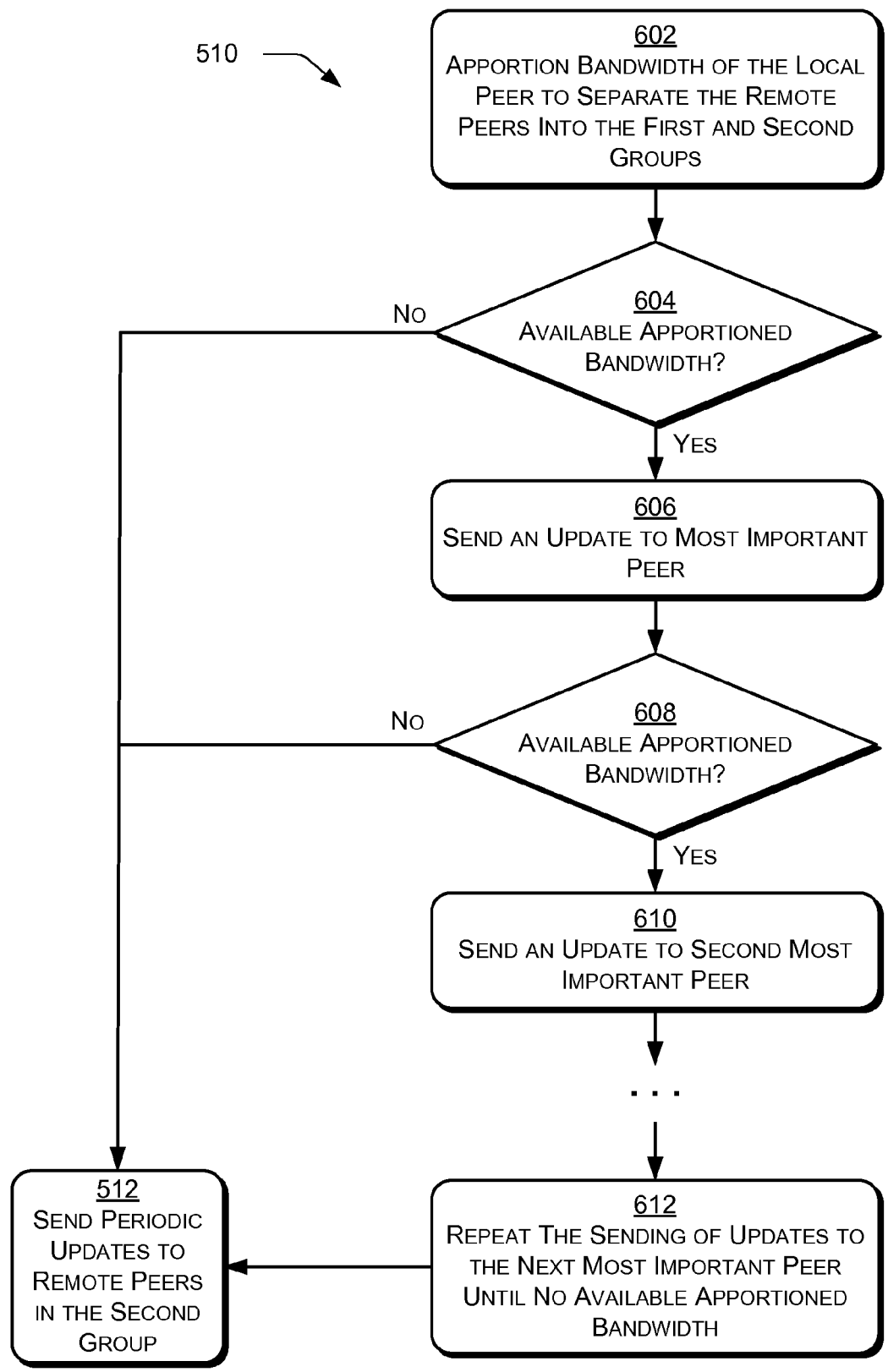
FIG. 6 is another flow diagram that illustrates an embodiment of the sending of the continuous updates to remote peers in the first group as shown in FIG. 5.

FIGS. 4-6 illustrate exemplary processes in accordance with the architecture discussed above. FIG. 4 demonstrates a process 400 that a local player implements when providing and receiving both continuous and periodic updates in a peer-to-peer gaming architecture, as discussed immediately above. The process 400 (as well as those shown below) is illustrated as a collection of blocks in a logical flow graph, which represents a sequence of operations that can be implemented in hardware, software, or a combination thereof. In the context of software, the blocks represent computer instructions that, when executed by one or more processors, perform the recited operations.

At operation 402, the local gaming system differentiates among multiple remote players to determine whether a remote player should receive continuous updates or periodic updates. In one implementation, the list generator 300 may accomplish this differentiation with reference to the heuristics discussed below. At operation 404, the local gaming system sends either continuous updates or periodic updates to each remote player according to the determination. Operation 406, meanwhile, comprises receiving updates from plural remote players. At operation 408, the local system determines whether it is receiving continuous or periodic updates from the remote players. If the local system concludes the former (i.e., the "continuous" branch from 408), the local gaming system updates activity of the corresponding game objects controlled by the remote player(s) at operation 410. If the local system concludes that it is receiving periodic updates (i.e., the "periodic" branch from 408), then at operation 412 the local gaming system uses guided artificial intelligence to simulate activity of the corresponding game objects controlled by the remote player(s). The section entitled "Guidable Artificial Intelligence" discusses this operation in detail below.

FIG. 5 depicts another process 500 that a local system may employ. This figure also introduces an embodiment of sending continuous updates and an embodiment of sending periodic updates. At operation 502, the local gaming system prioritizes multiple remote peers based on importance of a remote peer to the local peer. At operation 504, the system separates the multiple remote peers into at least first and second groups. The local system inquires, at operation 506, whether it is sending one or more pairwise rapid agreement (PRA) messages. If so (i.e., the "Yes" branch from 506), the local system prioritizes the PRA message(s) over both continuous and periodic updates at operation 508. If the system determines that it is not sending a PRA message (i.e., the "No" branch from 506), the local system proceeds to send continuous updates to remote peers in the first group at operation 510. Finally, at operation 512, the local system sends periodic updates to remote peers in the second group.

Having introduced operation 510, FIG. 6 depicts one exemplary detailed implementation of operation 510 in FIG. 5 by which the local system may send continuous updates to the remote peers in the first group. At operation 602, the local system apportions bandwidth of the local peer to separate the remote peers into the first and second groups. As discussed above, this apportioned amount may comprise an amount a for the first group, leaving an amount $1-\alpha$ for the remaining groups, here illustrated as the second group. At operation 604, the local system inquires whether available apportioned bandwidth exists to send an update. If available apportioned bandwidth does not exist (i.e., the "No" branch from 604), then the local system proceeds to operation 512 to send periodic updates to remote peers in the second group. If, however, such bandwidth is available (i.e., the "Yes" branch from 604), then the local system sends an update to the most important peer at operation 606. As illustrated in FIG. 3, this will generally be the peer listed at the top of the priority list created by the priority list generator 302.

At operation 608, the local system again inquires whether available apportioned bandwidth exists capable of sending an update to another remote peer. Again, if the apportioned bandwidth will allow it (i.e., the "Yes" branch from 608), the local system will send an update to the second most important peer at operation 610. Likewise, if the remaining apportioned bandwidth will not allow an update of such size to be sent (i.e., the "No" branch from 608), then the local system proceeds to operation 512. As illustrated, this process repeats at operation 612 for some variable number of operations until the updates to remote peers in the first group exhausts the apportioned bandwidth. Of course, the local system could conceivably provide all remote peers with updates before exhausting the apportioned bandwidth. This may be true, for instance, in a game with only a few players. Nevertheless, the local peer will generally consume the bandwidth apportioned for the remote peers in the first group before updating the remote peers in the second group at operation 512.

Figure 7:
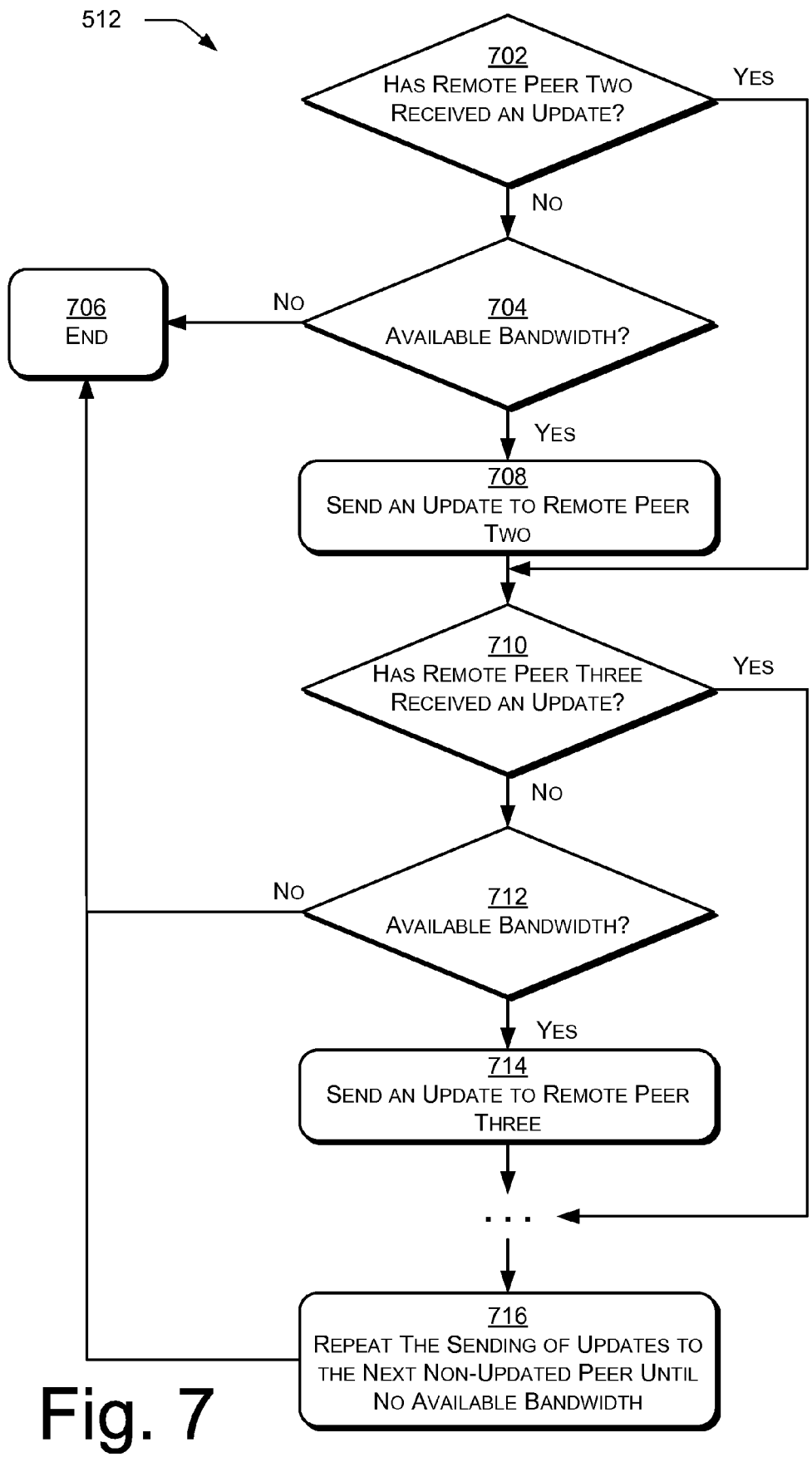
FIG. 7 is another flow diagram that illustrates an embodiment of the sending of the periodic updates to remote peers in the second group, also as shown in FIG. 5.

FIG. 7 depicts one exemplary implementation of operation 512 in FIG. 5 by which the local system may send these periodic updates to the remote peers in the second group. At operation 702, the local system asks whether Remote Peer Two (or whichever remote peer is first on the round robin list) has already received an update. Remote Peer Two may have already received an update, for instance, if this peer was part of the local peer's focus set for this frame. If so (i.e., the "Yes" branch from 702), then the process moves on to operation 710 to inquire whether the next remote peer (e.g., Remote Peer Three) has previously received an update. If Remote Peer Two has not received an update (i.e., the "No" branch from 702), then at operation 704 the local system inquires as to whether there is available bandwidth to send an update to a peer. If not (i.e., the "No" branch from 704), then the process ends at operation 706. If adequate bandwidth does exist (i.e., the "Yes" branch from 704), however, then the local system sends an update (e.g., a "periodic" update) to Remote Peer Two at operation 708. At operations 710-714, the above operations 702, 704, and 708 repeat for the next remote peer on the round robin list (e.g., Remote Peer Four). Operation 716 represents that the sending of updates to the next non-updated peer repeats until no available bandwidth exists. Generally, in bandwidth-limited architectures with a large number of peers, this will occur before all remote peers receive an update for a particular frame.

It is finally noted that while the above implementations presume that the numbers "n" are "g" are equal (i.e., that a single player plays on each gaming system 102(1)-(g)), these numbers may also be different. This may be true for embodiments where multiple players play on a single gaming system. In these instances, importance may be determined on a system-to-system basis, rather than on an individual player basis. That is, a local gaming system (e.g., 102(1)) may aggregate the importance of all players playing on a particular remote gaming system (e.g., 102(2), . . . , (g)). The gaming systems may then be prioritized based on each system's total importance, or upon the average importance of each player playing on that particular gaming system. Conversely, a local gaming system may instead prioritize on an individual player basis in the same manner discussed above in regards to the embodiments having a single player on each gaming system.

Estimating Player Importance

Referring again to FIG. 3, priority list generator 302 differentiates amongst and prioritizes the Remote Players Two through n. By doing so, frequent updates may be sent to the most important players while less frequent updates can be sent to less important players. One way to prioritize and sort the remote players consists of assigning importance values to each remote player indicative of how important a remote player is to the local player. Since inferring player intent is difficult, these embodiments employ certain heuristics to estimate what game objects a player currently focuses on. These heuristics combine, via a linear equation in some instances, certain attention or importance components.

Imagine that Player j (the local player in this example) computes an importance value for each remote player and, further, that Player j is currently computing such a value for Remote Player i. One way to finalize the importance of Remote Player i is to define a total importance value ($I_{ij}^{total}$) equal to the sum of a local importance value ($I_{ij}^{local}$) and a remote importance value ($I_{ij}^{remote}$). In other words, the computation that Player j performs for classifying the importance of Player i is the following:

$$I_{ij}^{total}=I_{ij}^{local}+I_{ij}^{remote} \tag{1}$$

A local importance value is an amount of interest that the remote player has in the local player, which is communicated over the network to the local player. In the current example, for instance, the local importance value $I_{ij}^{local}$ equals the amount of interest that Player i has in Player j. Conversely, a remote importance value is defined as an amount of interest that a local player thinks a remote player should have in the local player. Continuing the current example, the remote importance value $I_{ij}^{remote}$ from equation one equals the amount of interest that Player j believes Player i should have in Player j. The priority list generator 302 generally weights both of these importance values, either in equation one or when weighting the elements that compose these values. In some implementations, the local value is weighted more than the remote value.

As mentioned, both the local and remote importance values may employ one or more importance components. Each component includes a function (F(i, j)) that computes a certain degree of attention or importance. Furthermore, the priority list generator 302 may weight each component before computing a summation. The weights ($w_1, \ldots, w_k$) may be either manually or automatically adjustable. Specifically, suppose the summed components comprise functions one through k ($F_1, \ldots, F_k$). The priority list generator 302 may therefore compute the local importance value from above (and possibly the remote importance value from above) with the following equation:

$$I_{ij}^{local} = w_1 \cdot F_1(i,j) + w_2 \cdot F_2(i,j) \ldots + w_k \cdot F_k(i,j) \quad (2)$$

Note that Remote Player i computes importance values with respect to the replica of Player j, as the replica of Remote Player j may differ from the actual state of the game object. The "Guidable Artificial Intelligence" section discusses this in more detail below. In any event, the priority list generator 302 may utilize multiple importance components. Such exemplary components consider the distance between the game objects controlled by the remote and local players, whether the players are aiming at one another, and how much time has transpired since the players interacted via a PRA message. Other components are also envisioned, such as whether one player possesses certain items, such as a flag, and whether the local and remote players currently ride together in a same vehicle.

Returning to the distance component, the priority list generator 302 assumes that importance is negatively related to the distance between a remote and a local player. In other words, a player is more likely to focus on a game object that is close to them as opposed to one that is farther away. Therefore, one of many ways to compute a distance component is by the following equation:

$$(1 - dist(i, j)/D_T)^{D\alpha} \text{ if } dist(i, j) \leq D_T \quad (3)$$

0 otherwise

In equation three, $D_T$ represents a threshold value beyond which the priority list generator 302 assumes that the players are not focused upon one another. $D_\alpha$, meanwhile, represents the rate at which attention falls off with distance. In some embodiments, a $D_T$ value of 1024 and a $D_\alpha$ value of 1.5 may be used, while a weight (e.g., $w_1$) of five may be employed. Finally, note that although the actual distance between two avatars in the game world is generally a symmetric component for both the local and remote player, the players' gaming systems may calculate the distance differently. This is because the local player's system observes the distance between the local player's avatar and a replica of the remote player's avatar, whereas the remote player's system observes the distance between the remote player's avatar and a replica of the local player's avatar.

Furthermore, the priority list generator 302 generally assumes that a game object, such as an avatar, at which a remote player aims is more important than a game object at which the remote player does not aim. Therefore, the priority list generator 302 defines an aiming angle deviation from Remote Player i to Local Player j as the angle between the forward vector of the avatar of Remote Player i and the vector from the avatar of Player i to the avatar of Local Player j. In some embodiments, the mean aiming angle deviation mangdev(i, j) is estimated with an exponentially weighted moving average updated with the aiming angle deviation of each frame. Then, the following equation may be used as the aiming angle importance component:

$$(1 - mangdev(i, j)/A_T)^{A\alpha \cdot log(dist(i,j))} \text{ if } mangdev(i, j) \leq A_T \quad (4)$$

0 otherwise

Again, $A_T$ represents a threshold value beyond which the priority list generator 302 assumes that Player i is not focused upon Player j. $A_\alpha$, meanwhile, represents the rate at which attention falls off with increasing angle. Equation four multiplies the fall-off rate by log(dist(i,j)) because angle deviations to players that are farther away differ much less than to those that are close (since at larger distances, a player's "visible cone" contains more players). Therefore, the importance of angle deviations falls off with distance. In some embodiments, an $A_T$ value of $\pi/4$ and an $A_\alpha$ value of 1.5 may be used, while a weight (e.g., $w_2$) of four may be employed. In some embodiments, other functions, such as the arctangent function, may be used in place of the logarithm function. Furthermore, the exponentially weighted average mangdev(i,j) is updated with an angle $A_T$ if the current deviation is larger than $A_T$. Also, if the average has not been updated with an angle $\leq A_T$ in the last $A_W = 5$ seconds, then the aiming angle importance component returns to zero. This reduces the likelihood that attention is given to players who have not been looked at in a long time.

As discussed above, in many games such as FPS games, the most important elements of a game are game object interactions, such as avatars striking each other during battle. Accordingly, the priority list generator 302 assumes that players that have recently interacted with one another via a PRA message are more likely to have a high level of attention on one another. In some embodiments, the following equation may be utilized to compute the PRA recency importance component:

$$\exp(-t_j/P_\alpha) \text{ if } t_j \leq P_T \quad (5)$$

0 otherwise

In equation five, $t_j$ represents an amount of time that has transpired since the last PRA interaction between Remote Player i and Local Player j. $P_T$, meanwhile, represents a threshold value beyond which the priority list generator 302 assumes interactions are irrelevant. Next, $P_\alpha$ controls how fast attention falls off after a PRA interaction. In some embodiments, $P_T$ and $P_\alpha$ values of three seconds and one (assuming a time unit of seconds) may be used, respectively. Finally, note that a weight (e.g., $W_3$) of seven may be employed.

Because the relevancy of these importance components can vary during the game, the weights given to each component may also vary. For instance, the relevancy of components may vary according to the weapon type the player wields. If, for example, a player wields a melee weapon, which the player can only utilize at close range, then the distance component weighting may increase while the angle component weighting may decrease. The converse is likely true, however, if a player wields a long-range sniper weapon. Finally, PRA recency weighting generally remains consistent in some embodiments.

Guidable Artificial Intelligence

Figure 8:
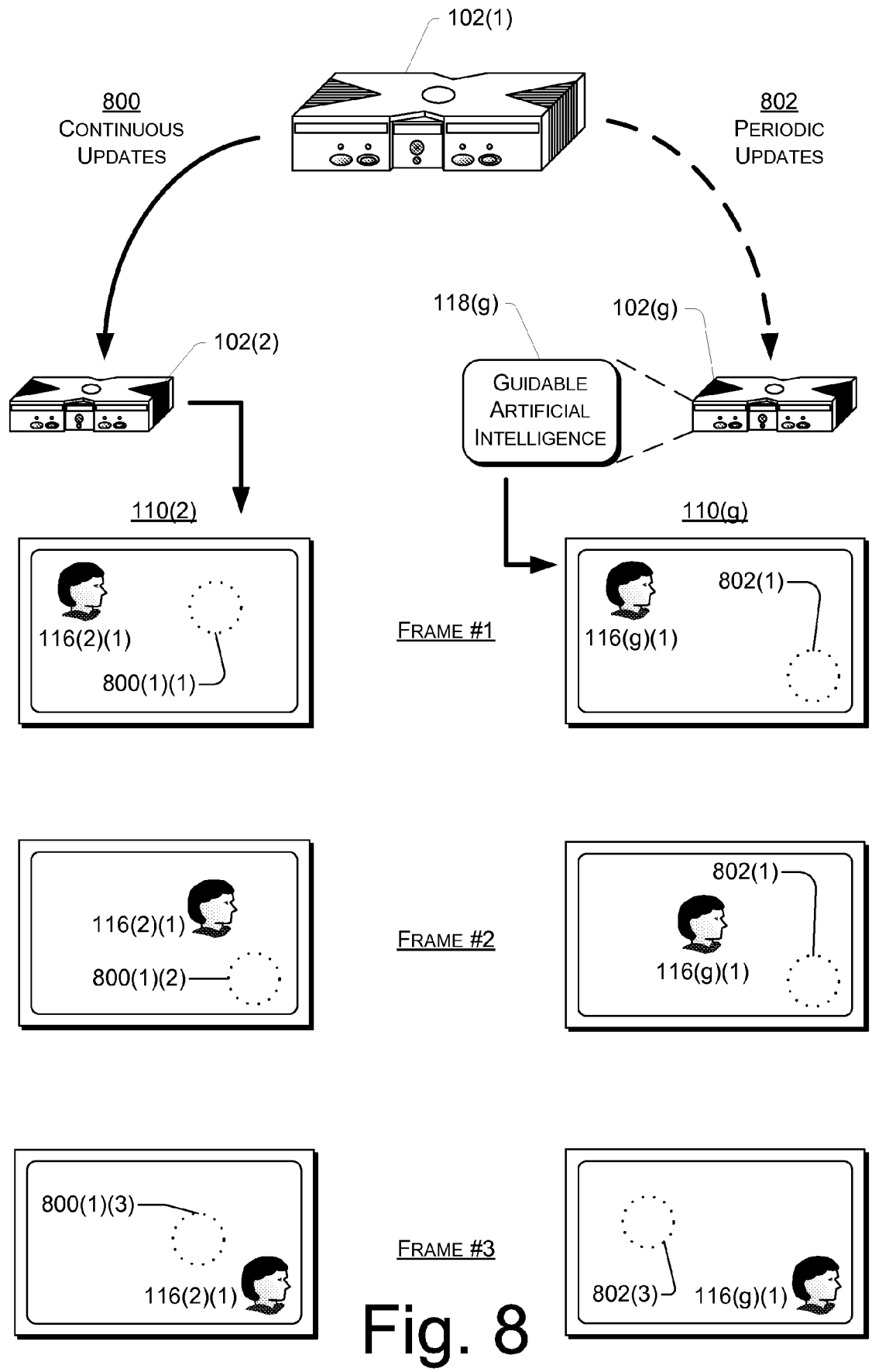
FIG. 8 illustrates a gaming system sending continuous updates to one remote peer and periodic updates to another remote peer.

FIG. 8 illustrates the gaming system 102(1) sending continuous updates 800 to the gaming system 102(2) and periodic updates 802 to the gaming system 102(g). In this example, the player controlling the gaming system 102(1) is again referred to as Player One, the player controlling the gaming system 102(2) is referred to as Player Two, and the player controlling the gaming system 102(g) is referred to as Player g. In the illustrated example of FIG. 8, the gaming system 102(1) has determined that Player Two is very important—and hence falls in the Player One's focus set for a current set of frames and receives continuous updates 800—while Player g is not as important and thus receives periodic updates 802, at least for the current set of frames.

A player that remains in another player's focus set will generally continue to receive continuous updates, usually every frame. Because this player receives such continuous updates, the updates will usually include exact or nearly exact game object state information as FIG. 8 illustrates. For instance, the sending player will generally send "state snapshots" (e.g., exact positional updates, wielded weapons, aiming angles, etc.) to the remote player in the focus set, rather than predictive information that may be included in periodic updates.

FIG. 8 portrays the display 110(2) of Player Two, who receives continuous updates 800. The display 110(2) includes a replica 116(2)(1) created by Player Two's system 102(2) and representing the avatar of Player One. In the first frame, Player One provides Player Two with an update 800(1)(1). The update 800(1)(1) includes state information corresponding to Player One's avatar for frame one. This information generally includes such characteristics as the location of player One's avatar, the weapon it is currently wielding, whether it is firing a projectile, its aiming angle, and the like.

As illustrated, by the beginning of the next frame (here, frame two) the gaming system 102(2) has utilized the update 800(1)(1) and has updated its replica 116(2)(1) accordingly. In frame two, the replica 116(2)(1) is placed in nearly the exact location and likely exhibits nearly the exact behavior as the actual avatar of Player One. Similarly, since Player Two remains in Player One's focus set, Player Two will receive another update 800(1)(2) corresponding to frame two. As illustrated, the gaming system 102(2) of Player Two then utilizes this update by frame three and places the replica 116(2)(1) in approximately the same location as the actual location of Player One's avatar. By differentiating amongst and prioritizing remote players, the remote players that most desire accurately placed replicas are thus provided with the most accurate information via the continuous updates 800.

Meanwhile, remember that the local gaming system 102(1) classified Player g as relatively less important. Accordingly, Player One does not provide Player g with the continuous updates 800 (unless player one has adequate bandwidth to service all players with continuous updates), but rather with the periodic updates 802.

As illustrated, the gaming system 102(g) may include a guidable artificial intelligence 118(g). Many games or gaming systems include basic AI, which may be modified to provide a guidable AI. While games generally use AIs to simulate "bots" (i.e., computer created and controlled players), the guidable AI 118(g) may simulate movements of an avatar of an actual player. As a result, the guidable AI 118(g) gathers the periodic updates 802 and simulates activity of a game object corresponding to the player sending the updates.

Game Object Guidance

Figure 9:
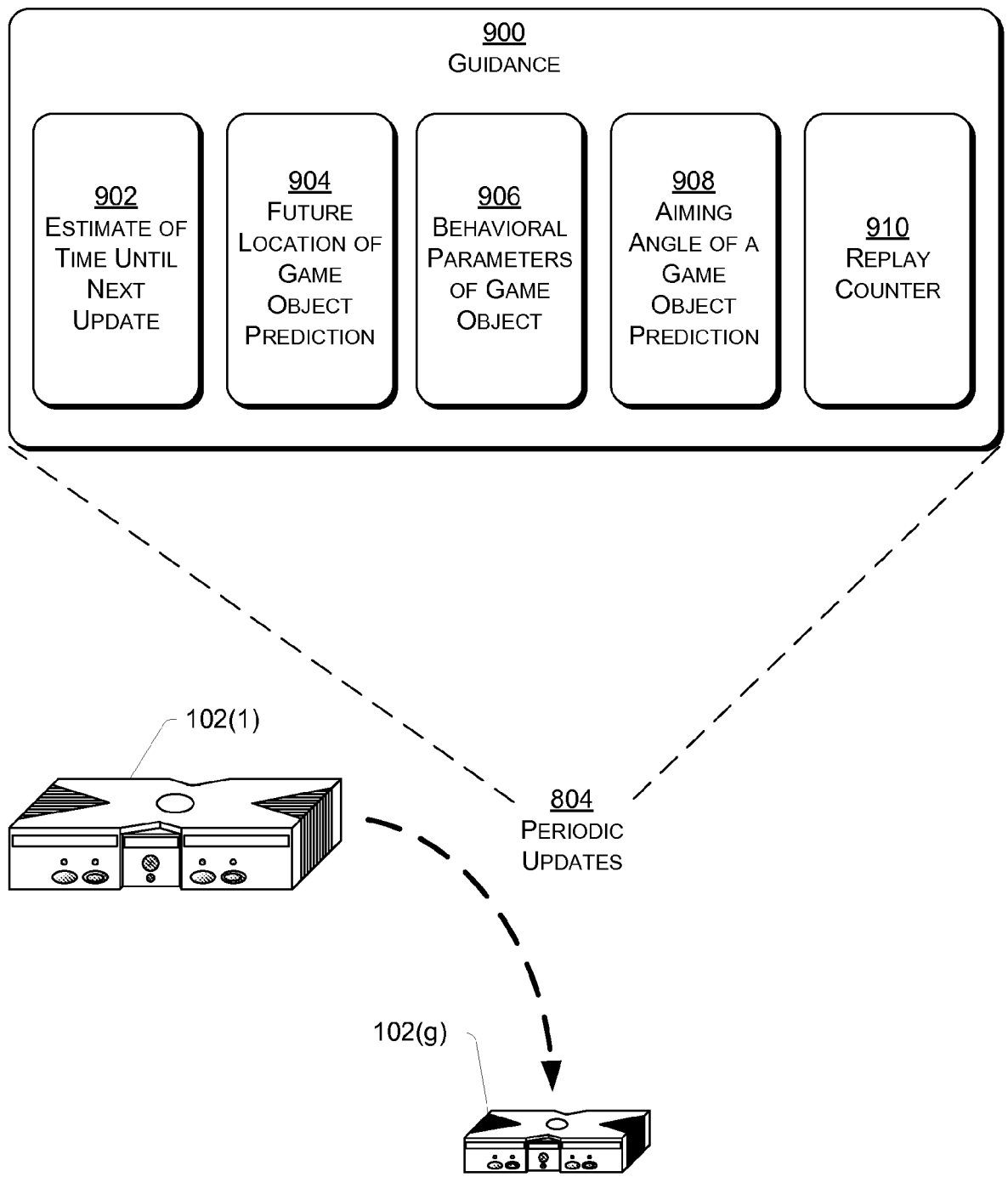
FIG. 9 illustrates exemplary elements such as guidance of the periodic updates of FIG. 8.

Before completing the discussion of the right side of FIG. 8, attention turns to FIG. 9, which illustrates exemplary components of the periodic updates 802 sent from gaming system 102(1) to gaming system 102(g). As the figure illustrates, these updates generally include guidance 900. The guidance 900 often includes predictive information—rather than state snapshots—corresponding to a game object (e.g., an avatar) of Player One. This predictive information coupled with the guidable AI 118(g) allows the remote system 102(g) to simulate the activity of Player One's avatar. Therefore, Player g will view realistic and relatively smooth actions of Player One's avatar, even though Player g will likely not receive updates every frame. Of course, because the guidable AI 118(g) simulates the activity based on the predictive information, the simulated actions may only approximate rather than exactly replicate the actual behavior of Player One's avatar.

The guidance 900 may include an estimate 902 of a time until a next update will be sent from Player One to Player g. The system 102(1) will generally calculate this based on Player One's total bandwidth, the amount dedicated to the player's focus set (in those embodiments), the total number of players, the size of updates, and the like. Of course, more players in a game results in longer time periods between periodic updates. The time estimate 902 may also simply comprise the amount of time that has elapsed between the current update and the previous update.

The guidance 900 may further include a prediction 904 of a future location of a game object controlled by Player One, portrayed and discussed immediately below in reference to the right side of FIG. 8. This future location prediction 904 may comprise information about a velocity or acceleration of the game object, which the receiving system may use to calculate the estimated future location. In some embodiments, the system makes the assumption that the player will continue to hold down the same buttons as are currently depressed until the next update is sent. A threshold value (e.g., t=5 seconds) may be set, after which the system will no longer assume that the player continues to depress the same buttons.

One exception to this process of formulating the prediction 904, however, occurs when the player's predicted future location is not on the ground (e.g., a player is launching through the air). Because some AIs may not be capable of simulating a replica's actions in the air, the system may wait for the first predicted location that is on the ground. That is, to accommodate the limitation of some AIs, the location prediction becomes the next location that the player is predicted to be on the ground. If need be, the time estimate 902 is increased to provide the receiving gaming system with a better estimate of when the replicated player will be located at the predicted and grounded location.

One or more behavioral parameters 906 of the game object may also accompany the guidance 900. These behavioral parameters may, for instance, direct the receiving system 102(g) to display a replica 116(g)(1) that is aggressive, passive, veering to one direction or another as it heads towards its destination, exhibiting wiggliness, jumping, hopping, crouching, or the like. In some instances, these parameters may be based on average observed behavior of the actual avatar. These observations may be weighted such that their influence exponentially decays with time.

The guidance 900 may also include a prediction 908 of an aiming angle of the game object, such as the avatar. For instance, the guidance 900 from Player One may instruct the gaming system 102(g) to simulate Player One's replica to aim at a certain angle. Heuristics may assist in these instructions by determining Player One's target, which may then be used as a reference point in creating an angular orientation of the replica of Player One. Equation four, reproduced and discussed above in the sub-section entitled "Estimating Player Importance", may be used to determine Player One's target.

More specifically, a value may be computed for a target that Player One's avatar looks at, and another value may be computed for a target that Player One's avatar shoots at. An exponentially weighted moving average of the latter value may be updated every time that Player One fires a shot. In some implementations, an a value of 0.5 may be used. The target that Player One shoots at is used when Player One shoots, while the target that Player One looks at is otherwise used. After a target score is computed for each remote player (e.g., Players One, Two, Three, . . . , n), the player with the highest likelihood of being the target is considered to be the target.

If, however, the computed score for all players is less than some threshold, e.g. 0.05 (i.e., it appears that Player One's avatar is not aiming at anyone in particular), then it is predicted that Player One's avatar is aiming at one of the primary axis directions relative to the Player One avatar's vector of movement (e.g., forward, backward, right, or left). For instance, one of these primary axis directions may be predicted if the Player One avatar's aim is less than fifteen degrees from that direction, relative to its vector of movement. This may be quite accurate, considering that player avatars commonly aim forward when running forward, backward when backpedaling, and sideways when strafing. Other sets of axes may also be employed in such situations; for example, axes on 45-degree angles might be appropriate for cases in which a player is holding down two movement buttons simultaneously.

The guidance 900 may also include a replay counter 910. Replay counter 910 helps to relay to the gaming system 102(g) discrete game object events, rather than the continuous events discussed above (e.g., behavioral parameters, aiming angle, etc.). These discrete events include shots fired, deaths, and respawns. Therefore, the replay counter 910 counts the number of times that Player One generates these events, such as the number of times Player One fires. The replay counter 910 then relays this information in the periodic updates 802, which the gaming system 102(g) will replicate. The replay of shots fired may be limited (e.g., to three) if Player One holds a slow weapon (e.g., a railgun or shotgun). Meanwhile, the replay of deaths and respawns may be limited to one, as multiple instant deaths or respawns would appear unrealistic.

Simulating Game Object Activity

Having considered exemplary components of the periodic updates 802 comprising guidance 900, attention now returns to the right side of FIG. 8. This illustrates the gaming system 102(1) sending the periodic updates 802 to the gaming system 102(g), which simulates a replica 116(g)(1) of Player One's avatar on the display 110(g). Here, the gaming system 102(1) sends a periodic update 802(1) at frame one. In this example, the gaming system 102(1) estimates that it will send another update 802(3) to player g during frame 3. The gaming system 102(1) includes this time estimate 902 in the update 802(1), which allows the guidable AI 118(g) to determine how long it should plan on simulating Player One's avatar's activity, as well as the rate it should travel towards the given destination. While in reality a player's bandwidth may generally not allow periodic updates to be sent at a rate of every other frame, the figure allows an easy comparison with the continuous updates 800 of FIG. 8.

The gaming system 102(1) also includes in the update 802(1) a prediction 904 of the location of Player One's avatar at frame three. The guidable AI 118(g) therefore simulates the progress of Player One's avatar via replica 116(g)(1) as the replica travels toward the predicted destination included in the update 802(1). The original update 802(1) may also include guidance concerning behavioral parameters 906 that the replica should emulate during this time frame. A prediction 908 of the Player One avatar's future aiming angle may also be included.

Although the guidable AI 118(g) simulates activity of the replica 116(g)(1), this guided replica generally may not employ any irreversible action, such as shooting and hitting a target. For instance, while the guided replica may utilize a replay counter 910 to simulate the shooting of a weapon, this replica should only shoot blanks in this fashion. Therefore, the shots fired while the guidable AI 118(g) controls the replica 116(g)(1) ensure a realistic portrayal of the replica but may not actually harm another player's avatar. Meanwhile, if Player One shoots and hits an avatar of Player g while Player g is simulating Player One's avatar via a guided replica, then a PRA message will generally be sent and executed. PRA messages thus allow the guidable AI 118(g) to simulate the replica 116(g)(1) without giving the guided replica the authority to engage in irreversible action.

Returning to FIG. 8, the gaming system 102(g) does not receive an update during frame two. Instead, the guidable AI 118(g) continues to simulate the likely activity of Player One's avatar. If the time estimate 902 was correct, then at frame three the gaming system 102(1) will send another update 802(3) to the gaming system 102(g), which may again call upon its guidable AI 118(g) to simulate the activity by extracting the guidance 900 within the update.

By sending periodic updates to certain remote players, the local player consumes less bandwidth sending to players who have relatively little interest in the local player. More bandwidth may thus be allotted to send continuous updates to more important players. Meanwhile, the use of guidable AIs allows for smooth depictions of replicas of even the less important players. Together, the architecture allows for smooth and realistic displays and highly accurate replicas of those players that matter most at the current time.

FIG. 8 also allows comparison between the replica 116(2)(1) created with the continuous updates 800 and the replica 116(g)(1) created with the periodic updates 802 and the guidable AI 118(g). As shown in frame two, each replica may be located in generally the same location, although the continuously-updated replica will likely be more accurate in this regard. Of course, Player Two is likely more focused upon Player One than is Player g, and therefore any aberration between the location of the Player One's avatar and Player g's replica is likely tolerable.

The accuracy of the location of the guided replica 116(g)(1) depends upon the accuracy of the location prediction 904. The accuracy also depends upon the length of time that Player g has been outside Player One's focus set, as the distance between the replica and the actual location of Player One's avatar may increase with time. In many instances, however, the smoothness and realism of the replica outweighs any inconsistency between the actual state and the replicated state. This may be especially true considering that the player viewing the guided replica likely pays relatively little attention to the player that the replica represents, at least for the current set of one or more frames. The viewing player is more likely to notice unrealistic behavior than behavior inconsistent with the true state.

Convergence

At some point, a first player who has been receiving periodic updates from a second player—and hence has been utilizing a replica created by a guidable AI—may enter the second player's focus set, and hence may begin receiving continuous rather than periodic updates. Convergence defines how a transition between utilizing periodic updates and utilizing continuous updates may occur. With reference to FIG. 8, imagine that Player g enters Player One's focus set. In such a case, Player g would begin receiving continuous rather than periodic updates, such as those depicted on the figure's left side.

Figure 10:
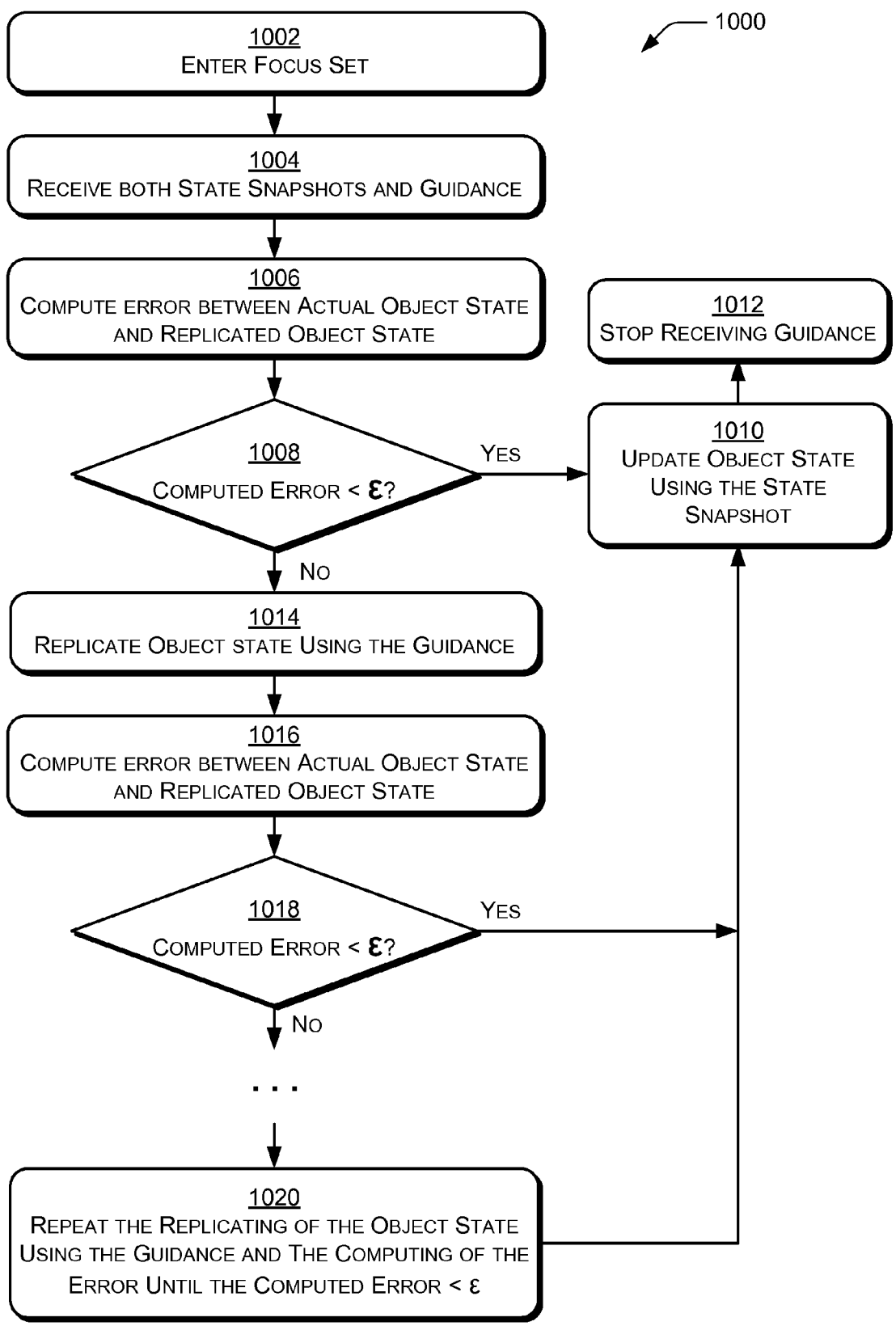
FIG. 10 is a flow diagram that illustrates a process to converge from replicating a game object state using guided artificial intelligence to updating the game object state using state snapshots.
Figure 11:
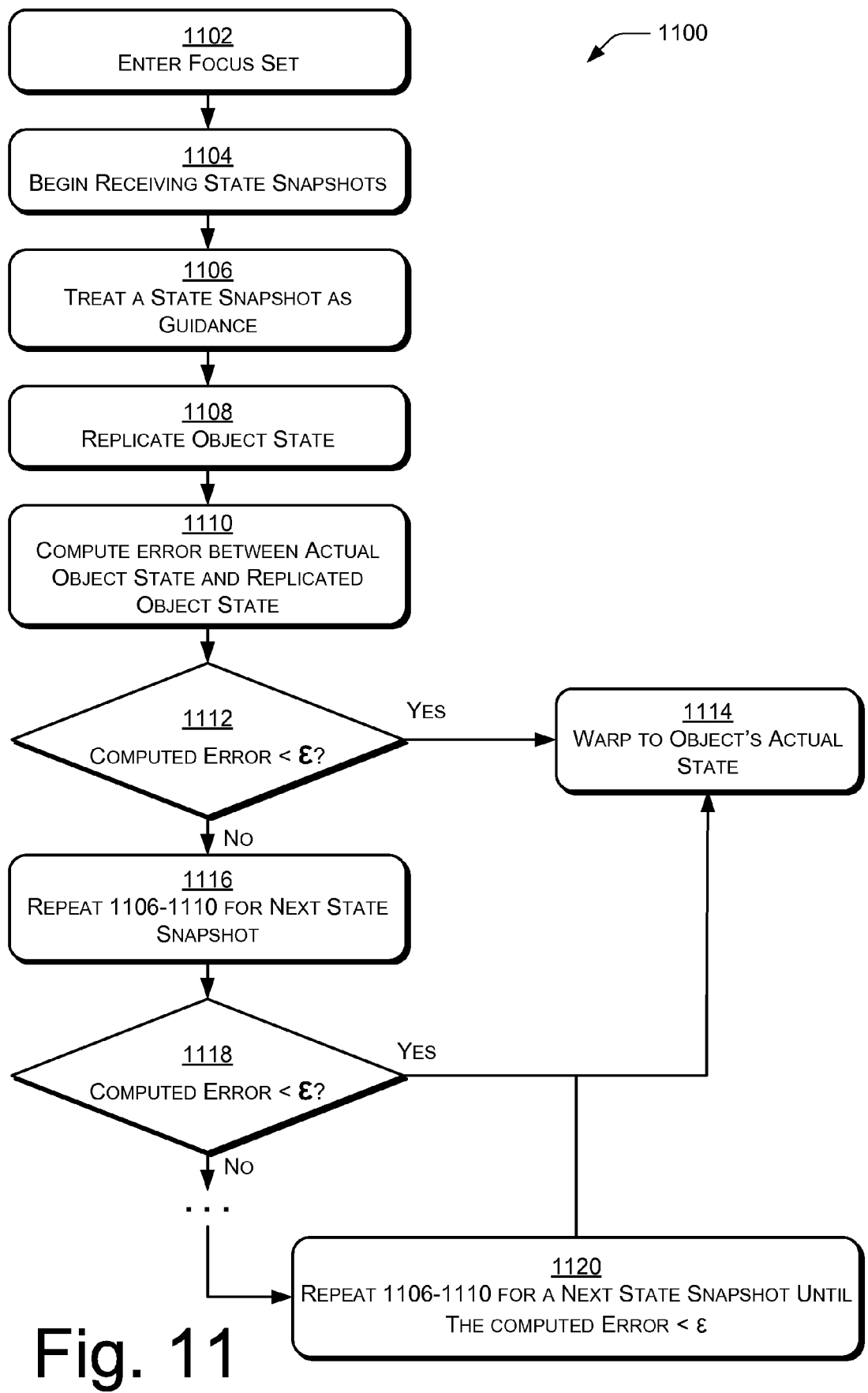
FIG. 11 is another flow diagram that illustrates an alternative process to converge from replicating a game object state using guided artificial intelligence to updating the game object state using state snapshots.

Such a convergence may be managed in multiple ways. For instance, when Player g enters the focus set, Player g's replica 116(g)(1) of Player One's avatar could warp to the avatar's actual location as specified by the first received continuous update. What this technique offers in simplicity, however, it lacks in realism, as such an immediate jump in position or the like may appear highly unusual to the player. FIGS. 10 and 11 therefore embody other possible convergence processes.

FIG. 10, for instance, depicts a convergence process 1000. Operation 1002 represents a player, such as exemplary Player g, entering the focus set of another player, such exemplary Player One. Player g may enter Player One's focus set for the reasons discussed above in the "Focus Set" discussion. In any case, when Player g enters the focus set, the corresponding gaming system 102(g) may request and receive both state snapshots and guidance at operation 1004. As discussed above in regards to continuous updates, state snapshots will generally comprise nearly exact state information of Player One's game object, such as an avatar. For instance, state snapshots will generally include at least the nearly exact position of Player One's avatar for that particular frame. Of course, guidance may include the components discussed above in regards to periodic updates.

At operation 1006 the gaming system 102(g) computes an error between the actual object state of Player One's avatar and the object state of the system's replica. At operation 1008, the gaming system 102(g) then inquires whether this error is less than a threshold value, E. In some instances, the error may be based on position, since other object properties (e.g., an object's behavior) can be interpolated quickly without jarring effects. In these instances, $\epsilon$ may equal 32 or the diameter of the object's bounding box (i.e., the distance that an avatar could normally travel in one frame). If the computed error is less than the threshold value (i.e., the "Yes" branch from 1008), then at operation 1010 the gaming system 102(g) begins updating the object's state with state snapshots. Of course, this means in some instances that the replica no longer utilizes a guidable AI but rather directly updates the object state from the snapshots themselves. The gaming system 102(g) may also request that only state snapshots—and not guidance—be sent at operation 1012.

If, however, the computed error is not less than some threshold value (i.e., the "No" branch from 1008), then at operation 1014 the gaming system 102(g) replicates the object state using the guidance. More specifically, in many instances the replicating of the object state using the guidance includes utilizing a guidable AI. Operation 1016 represents again computing an error between the actual object state and the replicated object state. Operation 1018 represents again comparing this computed error against the threshold value. As discussed above, if this error is less than the threshold (i.e., the "Yes" branch from 108) then the process proceeds to update the object's state using the state snapshot and request that the gaming system 102(1) stop sending guidance. If the computed error is still greater than the threshold value (i.e., the "No" branch from 1018), meanwhile, then the process proceeds to operation 1020. As illustrated, operation 1020 represents repeating the replicating of the object state using the guidance and the computing of the error until the computed error is less than the threshold. As illustrated, updating the object using the state snapshot and requesting to stop receiving the guidance follows.

FIG. 11 depicts an alternative exemplary convergence process 1100. Similar to operation 1002, operation 1102 represents a player (e.g., Player g) entering another player's focus set (e.g., Player One). At operation 1104, exemplary Player g begins receiving state snapshots. At operation 1106, the gaming system 102(g) treats the state snapshot as guidance. Accordingly, operation 1108 comprises replicating the object state with the guidance and, likely, a guidable AI. Operation 1110 represents computing an error between the actual object state and the replicated object state. The gaming system 102 (g) likely computes this error. Operation 1112, meanwhile, signifies comparing the computed error against a threshold value. Again, the error may be based on position, since other object properties (e.g., an object's behavior) can be interpolated quickly without jarring effects. In these instances, E may equal 32 or the diameter of the object's bounding box (i.e., the distance that an avatar could normally travel in one frame). If the computed error is less than this threshold value (i.e., the "Yes" branch from 1112), then Player g's replica warps to the object's actual state at operation 1114.

If the computed error is not less than the threshold value (i.e., the "No" branch from 1112), then operation 1116 repeats operations 1106-1110 for the next state snapshot. Operation 1118 signifies again comparing the newly-computed error against the threshold value. If the computed error is still not less than the threshold (i.e., the "No" branch from 1118), then operation 1120 follows and represents the repeating of operations 1106-1110 for subsequent state snapshots until the computed error is less than the threshold value. As illustrated, operation 1114 follows and the replica warps to the object's actual state.

As opposed to a first player's convergence into a second player's focus set, the first player may also sometimes exit the second player's focus set throughout the game. When the exited player's gaming system begins receiving updates at a "best-effort" class service, the system will know that the player has left the focus set. This "best-effort" service class generally includes sending periodic updates comprising guidance, as discussed above. Accordingly, the exited-player's gaming system will resume using the guidable AI to control the replica's state.

Non-Instant Hit Weapons

Non-instant hit weapons, such as missile launchers, present unique challenges in peer-to-peer gaming architectures utilizing the different update classes and the guidable AIs discussed above. Generally, any weapon that causes damage but is not an instant-hit weapon defines a non-instant hit weapon. As opposed to an instant-hit weapon where the game measures skill only at the player shooting, the game measures skill for non-instant hit weapons at the player being targeted as well. In the former case, players display skill by properly aiming and firing the weapon, while in the latter case players can also display skill by successfully dodging the fired projectile and any accompanying explosion. Therefore, for non-instant hit weapons, the game may generally utilize a "shootee-decides" paradigm in which the targeted player's gaming system decides whether or not a hit occurs.

In the case of a shooter firing a missile, the shooter first communicates the missile's existence to the targeted player. This communication allows the targeted player a chance to dodge the missile. If the targeted player unsuccessfully dodges, then that player communicates the hit to the shooter. This paradigm presents two unique complexities. First, in a system utilizing different update classes, each game player may learn about the missile at different times. Second, a related complexity results from the fact that bystanders can affect the path of projectiles such as missiles.

Several possibilities exist for mitigating time delays for non-instant hit projectiles such as missiles. First, the missile could become "real" to each player at the instant in time that the shooting player fires the missile. For instance, envision that Player One fires a missile near Player Two and Player g, and further that only Player Two currently resides within Player One's focus set. As such, Player Two will likely learn of the missile before Player g. Player Two would therefore see the missile through its entire travel path, giving Player Two an adequate opportunity to dodge. Meanwhile, Player g, who is receiving periodic updates, will likely learn of the missile sometime after it has been fired. Therefore, by the time the missile appears on the display 110(g) of Player g, the missile may be well on its way to or already at its intended target. While this solution keeps the timing of projectiles consistent, it will generally fail to allow Player g adequate time to dodge the projectile.

A second solution remedies this infirmity at the slight expense of complete global consistency. Here, each player simulates an individual copy of the projectile such as the missile when that respective player learns of the missile. In the example above, the missile will appear to have been fired to Player Two nearly instantaneously, as Player Two will learn of the missile nearly as soon as it is fired. The missile will only appear to have been fired to Player g, meanwhile, when Player One sends the periodic update to Player g containing notification of the missile. This allows each player-even those who don't reside in a player's current focus set-adequate time to dodge non-instant hit projectiles. Such a solution places a premium on fairness to each individual game player.

A second complexity results from a world where players simulate the same missile at different points in time. Specifically, the surrounding environment may change in the time that elapses between when Player One actually fires the missile and when Player g learns of and simulates the missile. Player locations may have changed, for instance. The fact that bystanders can affect the course of a non-instant hit projectile—and hence affect whether the projectile injures other players—further complicates the issue. For instance, if a missile strikes a bystander located near another player, the missile will explode near and possibly injure the other player. If, however, the bystander dodges, then the missile will likely sail past both the bystander and the other player, and neither will be hurt.

Accordingly, it is possible that Player Two could see the missile that it simulates explode and seemingly harm nearby Player g. Nevertheless, Player g may have successfully dodged the missile that Player g simulated. Therefore, while Player Two may believe that Player g was hit and should possibly die, Player g might not die or even show damage in Player Two's view. Conversely, Player Two may see Player g successfully dodge the missile that Player Two simulated, while in reality the missile simulated by Player g actually struck Player g. Player Two may thus see Player g die at a time when Player g suffers no perceivable damage, at least from Player Two's perspective. Again, achieving game fairness amongst all players outweighs this slight global inconsistency. Furthermore, it is likely that the shooter's focus set includes any targeted player and, therefore, that all targeted players receive continuous updates anyhow.

Determining projectile paths must also be determined in a game-world where each player simulates a non-instant hit projectile at a time when that respective player learns of the projectile. Again, several options exist. For example, the game environment itself may serve as a reference point and define the projectile's path. For instance, if Player one shoots a missile towards a certain corner of a room, each surrounding player simulation of the missile may travel towards this corner of the room. In some instances, however, this may unfairly penalize the shooter and benefit targeted players who receive periodic updates. More specifically, players receiving periodic updates will likely have moved from the location upon which Player One fired by the time these players learn of the missile, while focus set players are more likely to still be located in this area when they receive their update.

A second option that utilizes individual game objects (e.g., player replicas) as reference points may achieve more uniform fairness. In these embodiments, when the shooter fires the projectile, the shooter will document the projectile's path relative to each player's replica at that instant in time. For instance, envision that Player One fires a missile directly in between the replicas of Player Two and Player g. Assume further that the missile's path—when fired—is three feet to the right of Player Two and three feet to the left of Player g. Also, the path is one foot higher than each targeted player's head. Whenever Player One communicates the fired missile to a player, the game object-based projectile path with respect to that player will also accompany the message. Therefore, when each player simulates the missile, the missile's path will be as near or as far to that player as when the shooter originally fired.

In a third embodiment, a determination may first be made as to whether or not a player is a target of the non-instant hit projectile at all. If so, then that player will receive the projectile-path information as described immediately above. If, however, a determination is made that a player is not being targeted and is not in danger of being struck by the missile, that player may receive different projectile path information from the shooter. Here, the non-targeted player may instead receive projectile path information in relation to the actual targeted player replica or object.

For instance, imagine that Player One fires a missile near Player Two, but far away from Player g. Targeted Player Two will receive replica-referenced projectile path information as discussed above (e.g., information that states: "simulate the missile so that it misses you two feet to the left of your current position"). For the non-targeted Player g, however, the game and gaming system may attempt to determine the intended target of the missile. In the instant example, the game and system may determine that the fired missile targeted Player Two. The heuristics discussed above in regards to the focus set discussion may be employed in this determination. At any rate, Player One's system may send projectile-path information corresponding to the missile's target to the system of Player g. Accordingly, when Player g simulates the missile, Player g will see that the missile was intended to target Player Two.

This embodiment also helps to achieve a more realistic global view of the gaming world. To illustrate, imagine how the simulated missile would appear to the non-targeted Player g without this embodiment. Here, Player g would be given projectile path information relative to Player g. Because, however, Player g was not targeted, the projectile path may veer a long ways away from Player g (e.g., 150° to the right of Player g and 100 feet away). Furthermore, while targeted Player Two may have been at or near this location when Player One actually fired the missile, Player Two's location may have greatly changed by the time Player g receives notice of the missile. Therefore, when Player g actually simulates the missile, the targeted area is potentially vacant. It would thus appear to Player g that Player One fired the projectile in a potentially random and unmanned location. Providing Player g with target-relative path information, however, remedies this potential inconsistency, as the projectile path would follow the targeted Player Two's movements for the purposes of Player g's simulated missile.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. In a peer-to-peer multiplayer game architecture where game objects are partitioned across participating peers, a method comprising:
   receiving guidance pertaining to activity of at least one game object controlled by a remote player; and
   simulating the activity of the at least one game object using artificial intelligence based on the guidance;
   converging from artificial intelligence simulation of the activity of the at least one game object to controlling the activity of the at least one game object via object updates, the convergence comprising:
   receiving an object update from the remote player;
   treating the object update as guidance;
   computing an error between a simulated state of the at least one game object and an actual state of the at least one game object; and
   if the computed error is less than a threshold value, warping to the at least one game object's actual state.

2. The method as described in claim 1, further comprising prioritizing modification of an object state based on a remote procedure call received from the remote player.

3. The method as described in claim 1, further comprising deciding, by a local player, whether a non-instant hit projectile sent by a remote player strikes an avatar controlled by the local player.

4. The method as described in claim 1, further comprising prioritizing remote players based on each remote player's attention on the local player and on the local player's estimate of how much attention each remote player should be paying to the local player.

5. The method as described in claim 1, wherein the guidance is received directly from the remote player.

6. The method as described in claim 1, wherein the guidance comprises at least one of: a predicted game object location, a predicted game object velocity, a predicted game object acceleration, a predicted game object behavioral parameter, a set of replay counters, or a predicted game object aiming angle.

* * * * *